(12) United States Patent
Yokoi

(10) Patent No.: US 7,613,910 B2
(45) Date of Patent: Nov. 3, 2009

(54) INFORMATION PROCESSING APPARATUS, METHOD, AND COMPUTER-READABLE RECORDING MEDIUM FOR REPLACING AN ENTRY IN A MEMORY DEVICE

(75) Inventor: Megumi Yokoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/062,472

(22) Filed: Feb. 22, 2005

(65) Prior Publication Data

US 2006/0095748 A1 May 4, 2006

(30) Foreign Application Priority Data

Sep. 30, 2004 (JP) ............... 2004-286129

(51) Int. Cl.
*G06F 9/00* (2006.01)
*G06F 9/44* (2006.01)

(52) U.S. Cl. ............... 712/239; 712/240; 712/234

(58) Field of Classification Search ......... 712/233–240; 711/133
See application file for complete search history.

(56) References Cited

U.S. PATENT DOCUMENTS

| | | | | |
|---|---|---|---|---|
| 5,265,213 A | * | 11/1993 | Weiser et al. ............... | 712/240 |
| 5,434,985 A | * | 7/1995 | Emma et al. ............... | 712/240 |
| 5,752,069 A | * | 5/1998 | Roberts et al. ............... | 712/23 |
| 5,758,142 A | * | 5/1998 | McFarling et al. ............ | 712/239 |
| 5,848,269 A | * | 12/1998 | Hara ......................... | 712/239 |
| 5,948,100 A | * | 9/1999 | Hsu et al. ................... | 712/238 |
| 6,108,775 A | * | 8/2000 | Shiell et al. ................. | 712/240 |
| 6,532,534 B1 | * | 3/2003 | Sunayama et al. ........... | 712/240 |
| 6,640,286 B2 | | 10/2003 | Kawamoto et al. .......... | 711/133 |
| 6,678,638 B2 | * | 1/2004 | Takamura ................... | 702/186 |

(Continued)

FOREIGN PATENT DOCUMENTS

EP 1271308 A2 1/2003

(Continued)

OTHER PUBLICATIONS

Chris H. Perleberg and Alan Jay Smith, Fellow, IEEE "Branch Target Buffer Design and Optimization"; IEEE Transactions on computers, vol. 42, No. 4, Apr. 1993; pp. 396-412.*

(Continued)

*Primary Examiner*—Eddie P Chan
*Assistant Examiner*—Idriss N Alrobaye
(74) *Attorney, Agent, or Firm*—Staas & Halsey LLP

(57) ABSTRACT

The present invention relates to an information processing apparatus predicting a branch destination of a branch instruction using a branch history register to realize effective replacement by enabling an unnecessary entry to be selected as an entry, which is an object of replacement, without using new resources in a full-associative memory device. The invention includes a selector for selecting one entry from all entries of a past branch history memory section if all entries of the past branch history memory section are in use when a branch history about a new branch instruction is registered into the past branch history memory section and a replacing section for registering the branch history about the new branch instruction into one entry selected by said selector, wherein the selector has a first selecting function of selecting one entry based on the branch history held by the past branch history memory section.

11 Claims, 17 Drawing Sheets

U.S. PATENT DOCUMENTS

| | | | |
|---|---|---|---|
| 6,895,498 B2* | 5/2005 | McDonald et al. | 712/238 |
| 7,055,023 B2 | 5/2006 | Tago et al. | |
| 7,069,426 B1* | 6/2006 | Hummel | 712/240 |
| 2002/1013823 | 9/2002 | Takamura | |
| 2002/0199091 A1 | 12/2002 | Tago et al. | |
| 2004/0003176 A1 | 1/2004 | Yokoi et al. | |
| 2004/0003214 A1* | 1/2004 | Sunayama et al. | 712/234 |
| 2004/0003218 A1* | 1/2004 | Ukai | 712/240 |

FOREIGN PATENT DOCUMENTS

| | | |
|---|---|---|
| JP | 6-67880 | 3/1994 |
| JP | 10-105463 | 4/1998 |
| JP | 2002-140234 | 5/2002 |
| JP | 2002-278752 | 9/2002 |
| JP | 2003-5956 | 1/2003 |
| JP | 2004-38323 | 2/2004 |

OTHER PUBLICATIONS

Guy, B.M., III; Haggard, R. "High performance branch prediction"; Mar. 31-Apr. 2, 1996 pp. 472-476; IEEE.*

Ayose Falcon, Jared Stark, Alex Ramirez, Konrad Lai, Mateo Valero "Prophet/Critic Hybrid Branch Predictoin"; Mar. 2004; ACM SIGARCH Computer Architecture News, vol. 32 Issue 2 Publisher: ACM.*

English Abstract of EP 1 271 308 A3 including European Search Report listing thereof (3 pages).

European Search Report mailed Jan. 2, 2008 issued with respect to the corresponding European Patent Application No. 05251180.5 (3 pages).

Japanese Office Action issued on Mar. 3, 2009 in corresponding Japanese Patent Application 2004-286129.

U.S. Appl. No. 11/703,225, filed Feb. 7, 2007, Megumi Yokoi, Fujitsu Limited, Kanagawa, Japan.

* cited by examiner

INFORMATION PROCESSING APPARATUS, METHOD, AND COMPUTER-READABLE RECORDING MEDIUM FOR REPLACING AN ENTRY IN A MEMORY DEVICE

BACKGROUND OF THE INVENTION

1) Field of the Invention

The present invention relates to a technique of replacing an entry in case that all entries are in use in a full-associative memory device, for example, a technique preferably used, in an information processing apparatus in which a global history system or a local history system is used for predicting a branch direction of a branch instruction with reference to a past branch history held by a full-associative branch history memory section (past branch history memory section), when replacing an entry of the branch history memory section with a new entry.

2) Description of the Related Art

Up to now, a full-associative memory device having a predetermined number of entries has been provided in various kinds of devices and has been widely used.

For example, there is a technique of providing a global history register including a full-associative memory device for holding information about a past branch history for the purpose of improving prediction accuracy, in an information processing apparatus which predicts a branch destination of a branch instruction using a branch history register which holds pairs of an address of a branch instruction and an address of the predicted branch destination of its branch instruction (see patent document 1 listed below).

In a full-associative memory device having only a fixed number of entries like this global history register, it is a key to an improvement in the performance how effectively the limited entries are used, and it is important, when replacing an entry, to surely replace an unnecessary entry of the plurality of entries.

Up to now, as a method of replacing an entry in a full-associative memory device, we have had a round robin method by which an entry registered earliest is replaced and a least-recently-used (LRU) method by which en entry least recently used since it was accessed is replaced.

Furthermore, we have other replacing methods including techniques of selecting an entry to be replaced on the basis of a success rate (number of coincidences) in branch prediction, in the technical field related to branch prediction for a branch instruction (see patent documents 2 and 3 listed below).

However, in the round robin method described above, it is not taken into consideration at all to use entries effectively, and an entry is erased without reservation if it was registered earliest even if it is very effective for branch prediction or it is in use, whereby it is difficult to say that the method is an effective replacing method.

Furthermore, in the LRU method described above, an entry least recently used since it was accessed is selected as an unnecessary entry which is an object of replacement, and therefore particularly in a global history register (see patent document 1 listed above) or the like which expects a history will be repeated and provides an expectation value from its periodicity, an entry least recently used since it was accessed is not always an unnecessary entry due to its characteristic.

In other words, it is desirable to avoid, from the viewpoint of the characteristic of the global history register, that the entry about such a long interval branch instruction as to appear with a low frequency but at a fixed interval is assumed to be an entry which is an object of replacement, if possible.

However, with the LRU method, the possibility of assuming the entry about an instruction appearing with a low frequency to be an entry, which is an object of replacement, becomes high, so it is also difficult to say that the LRU method is an effective method.

In addition, with the LRU method, it is necessary to separately hold information about an accessed history, which requires a resource cost for holding such information, and therefore the limited resources of the full-associative memory device are not used effectively.

Furthermore, with techniques of using a success rate in branch prediction, etc. disclosed in patent documents 2 and 3 described above, it is necessary, like the LRU method, to separately hold information about the success rate, etc., thereby increasing the resource cost.

[Patent Document 1] Japanese Patent Laid-Open (Kokai) No. 2004-38323

[Patent Document 2] Japanese Patent Laid-Open (Kokai) No. 2002-278752

[Patent Document 3] Japanese Patent Laid-Open (Kokai) No. HEI 6-67880

SUMMARY OF THE INVENTION

The present invention has been developed in view of such problems and aims to realize effective replacement by enabling an unnecessary entry to be selected as an entry, which is an object of replacement, without using new resources in a full-associative memory device.

In particular, the present invention aims to realize effective replacement, in an information processing apparatus, for example, in which a global history system is employed, by enabling an entry of the entries of the branch history memory section, which does not affect prediction about a branch direction of a branch instruction without its entry, to be selected as an entry, which is an object of replacement, without using new resources.

In order to accomplish the above aim, an information processing apparatus according to the present invention comprises: a branch history register for holding, in order to predict a branch destination of a branch instruction, a correspondence table providing the correspondence between an address of said branch instruction and an address of the predicted branch destination of said branch instruction; a past branch history memory section for holding past branch directions of said branch instruction as a branch history; a branch direction predictor for predicting a branch direction of said branch instruction on the basis of said branch history held by said past branch history memory section; a branch history register updating section for updating said correspondence table held by said branch history register on the basis of the branch direction predicted by said branch direction predictor; a selector for selecting one entry from all entries of said past branch history memory section in case that all entries of said past branch history memory section are in use when a branch history about a new branch instruction is registered into said past branch history memory section; and a replacing section for registering the branch history about said new branch instruction into said one entry selected by said selector, wherein said selector has a first selecting function of selecting said one entry on the basis of said branch history held by said past branch history memory section.

Said selector preferably has a second selecting function of selecting, as said one entry, an entry registered earliest of all entries of said past branch history memory section, and employs an entry selected with said first selecting function on a higher priority basis than an entry selected with said second selecting function.

Furthermore, said selector preferably has a second selecting function of selecting, as said one entry, an entry used earliest for prediction by said branch direction predictor of all entries of said past branch history memory section, and employs an entry selected with said first selecting function on a higher priority basis than an entry selected with said second selecting function.

In addition, said first selecting function of said selector preferably is a function of selecting, as said one entry, an entry in which said branch history held by said past branch history memory section includes only branches taken, and in this case said first selecting function of said selector preferably is a function of selecting an entry in which the number of branches taken included in said branch history held by said past branch history memory section is equal to or more than a predetermined number.

Furthermore, said past branch history memory section preferably holds, as said branch history, the number of branches, which were successively taken, and the number of branches, which were not successively taken until a changeover is made twice of the branch taken/the branch not taken, which signifies said branch direction of said branch instruction, and said branch direction predictor preferably predicts the branch taken/the branch not taken, which is said branch direction of said branch instruction, on the basis of said number of branches successively taken and said number of branches not successively taken.

In addition, said information processing apparatus preferably further comprises a branch history architecting state determining section for determining whether or not said branch history held by said past branch history memory section is in an initial architecting state, wherein said branch direction predictor preferably does not perform prediction of said branch direction based on said branch history when said branch history architecting state determining section determines that said branch history is in an initial architecting state.

Furthermore, in order to accomplish the above aim, a replacing method according to the present invention for an information processing apparatus which includes a branch history register for holding, in order to predict a branch destination of a branch instruction, a correspondence table providing the correspondence between an address of said branch instruction and an address of the predicted branch destination of said branch instruction, a past branch history memory section for holding past branch directions of said branch instruction as a branch history, a branch direction predictor for predicting a branch direction of said branch instruction on the basis of said branch history held by said past branch history memory section, and a branch history register updating section for updating said correspondence table held by said branch history register on the basis of the branch direction predicted by said branch direction predictor, said replacing method, used for entries of said past branch history memory section in case that all of said entries are in use when a branch history about a new branch instruction is registered into said past branch history memory section, comprises the steps of: (a)selecting one entry from all entries of said past branch history memory section; and (b)registering a branch history about said new branch instruction into said one entry selected in said step (a) of selecting, wherein said step (a) of selecting includes a step of (a-1) selecting said one entry on the basis of said branch history held by said past branch history memory section.

In addition, in order to accomplish the above aim, a replacing program according to the present invention for an information processing apparatus comprising: a branch history register for holding, in order to predict a branch destination of a branch instruction, a correspondence table providing the correspondence between an address of said branch instruction and an address of the predicted branch destination of said branch instruction; a past branch history memory section for holding past branch directions of said branch instruction as a branch history; a branch direction predictor for predicting a branch direction of said branch instruction on the basis of said branch history held by said past branch history memory section; and a branch history register updating section for updating said correspondence table held by said branch history register on the basis of the branch direction predicted by said branch direction predictor, allows a computer to realize a replacing function used for entries of said past branch history memory section in case that all of said entries are in use when a branch history about a new branch instruction is registered into said past branch history memory section, and allows said computer to: function as a selector for selecting one entry from all entries of said past branch history memory section and as a replacing section for registering a branch history about said new branch instruction into said one entry selected by said selector; and function such that said selector has a first selecting function of selecting said one entry on the basis of said branch history held by said past branch history memory section.

In addition, in order to accomplish the above aim, a computer-readable recording medium according to the present invention is a computer-readable recording medium on which said replacing program is recorded.

As described above, according to the present invention, an entry, which is an object of replacement, is selected on the basis of a branch history originally provided in the past branch history memory section to be used for predicting a branch direction, so that an entry unnecessary for branch prediction can be selected on a priority basis without specially holding new information for replacing, in other words, without using new resources, whereby effective replacement can be performed.

In addition, selecting an entry, in which said branch history held by the past branch history memory section includes only branches taken, i.e. an entry, in which branches were all taken since registration in the branch history and yet the number of branches taken is equal to or more than a predetermined number, as an entry, which is an object of replacement, on a priority basis makes it possible to select an entry of the entries of the past branch history memory section, which does not affect prediction about a branch direction of a branch instruction without its entry, as an entry, which is an object of replacement. This makes it possible to realize effective replacement, to effectively use the limited resources of the past branch history memory section, and to improve the accuracy (performance) of prediction about a branch direction performed by using the past branch history memory section.

BRIEF DESCRIPTION OF THE DRAWINGS

FIG. 4(a) is a concrete example showing branch directions of a branch instruction, and FIG. 4(b) shows the data structure of a branch history in the concrete example of FIG. 4(a);

DESCRIPTION OF THE PREFERRED EMBODIMENTS

Embodiments of the present invention are described below with reference to the drawings.

[1] An Embodiment of the Present Invention

Figure 1:
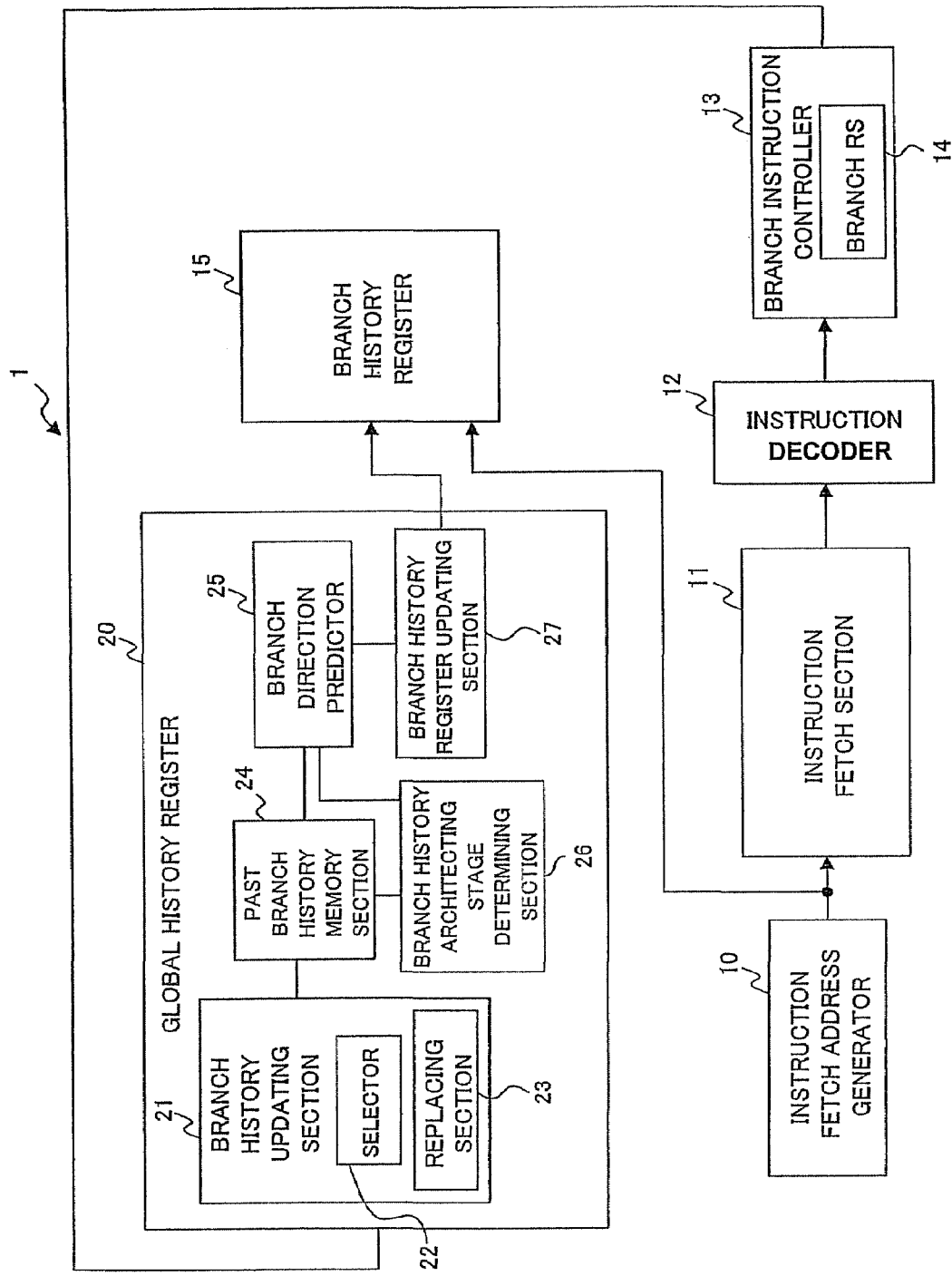
FIG. 1 is a block diagram showing the configuration of an information processing apparatus which is an embodiment of the present invention.

At first, the configuration of an information processing apparatus which is an embodiment of the present invention will be described. FIG. 1 is a block diagram showing the configuration of the information processing apparatus 1 which is an embodiment of the present invention. As shown in FIG. 1, the information processing apparatus 1 which is an embodiment of the present invention comprises an instruction fetch address generator 10, an instruction fetch section 11, an instruction decoder 12, a branch instruction controller 13, a branch history register 15, and a global history register 20.

In the information processing apparatus 1, the instruction fetch section 11 outputs an instruction fetch request using an instruction fetch address generated by the instruction fetch address generator 10, and at the same time retrieves the branch history register 15.

When a branch instruction corresponding to the instruction fetch address has been registered in the branch history register 15, the instruction fetch section 11 reads the instruction address of a branch destination predicted by the branch history register 15, and performs next instruction fetch on the basis of the instruction address which has been read.

Figure 2:
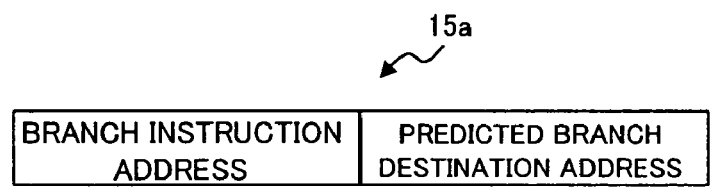
FIG. 2 shows the data structure of a correspondence table held by the branch history register of the information processing apparatus which is the embodiment of the present invention.

FIG. 2 shows the data construction of a correspondence table 15a held by the branch history register 15. As shown in FIG. 2, the branch history register 15 holds the correspondence table 15a consisting of branch instruction addresses (IARs) and predicted branch destination addresses (TIARs), and has stored a branch instruction address and a corresponding predicted branch destination address in the correspondence table 15a, every one of branch instructions executed in the past about which the branch would be predicted taken.

As described above, the branch history register 15, which is used, when a branch instruction is contained in the instruction data taken out by the instruction fetch section 11, to predict a branch destination address of the branch instruction, allows a predicted branch destination address to be retrieved from a branch instruction address on the basis of the correspondence table 15a.

In other words, the branch instruction address held by the correspondence table 15a of the branch history register 15, which is an instruction address of a branch instruction, is used as an index. Furthermore, the predicted branch destination address, which is a branch destination address to which the branch went when the branch instruction was executed in the past, is used as a prediction value of a branch destination address in case that said branch instruction would be executed next time.

On the other hand, branch instructions fetched by the instruction fetch section 11 are decoded by the instruction decoder 12, and the branch instructions are processed by the branch instruction controller 13.

Furthermore, the branch instruction controller 13 is provided with a branch reservation station (indicated as BRANCH RS in the figure, and referred as a branch RS hereinafter) 14, which holds information about branch instructions for which processing has been executed.

The branch RS 14 holds the address of a branch instruction, and the instruction address of a branch destination of the branch instruction, for example, every one of branch instructions processed, and holds branch information, etc. about the branch taken/branch not taken of the branch instructions, which is registered in the branch RS 14 by the branch instruction controller 13.

The information registered in the branch RS 14 is passed from the branch instruction controller 13 to the branch history register 15 and/or the global history register 20 described later as required.

The global history register 20, which predicts a branch direction as to whether or not the branch is next taken with the above branch direction, based on the branch history of the branch instruction, to update the branch history register 15 on the basis of the result of the prediction, comprises a branch history updating section 21, a past branch history memory section 24, a branch direction predictor 25, a branch direction architecting stage determining section (branch direction architecting state determining section) 26, and a branch history register updating section 27.

The branch history updating section 21 registers a branch history into or updates a branch history in the past branch history memory section 24 described later on the basis of information about a branch instruction held by the branch RS 14 received from the branch instruction controller 13. Further, The branch history updating section 21 comprises a selector 22 and a replacing section 23. Details of the selector 22 and replacing section 23 will be described later.

The past branch history memory section 24, which is a full-associative memory device, holds the past branch taken/ the branch not taken (i.e., branch direction), as a branch history, about the branch instruction passed from the branch RS 14 (i.e., registered and updated by the branch history updating section 21), which is a conditional branch instruction by which the branch was taken when executed in the past. The past branch history memory section 24 has a predetermined number of entries (n entries 0 to n-1 in this embodiment) and holds respective branch histories about a plurality of branch instructions.

Figure 3:
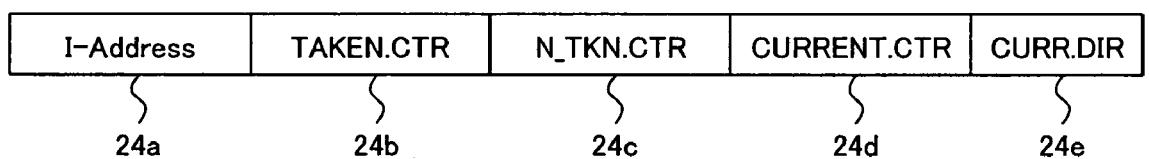
FIG. 3 shows the data structure of a branch history held by the past branch history memory section of the global history register of the information processing apparatus which is the embodiment of the present invention.

FIG. 3 shows the data structure of a branch history held in each of entries of the past branch history memory section 24. As shown in FIG. 3, the past branch history memory section 24 comprises, in each of the entries, an I-Address 24a, a TAKEN counter (denoted as TAKEN.CTR in FIG. 3) 24b, a NOT-TAKEN counter (denoted as N_TKN.CTR in FIG. 3) 24c, a CURRENT counter (denoted as CURR.DIR in FIG. 3) 24d, and a CURRENT direction (denoted as CURR.DIR in FIG. 3) 24e respectively.

The I-Address 24a is an address of the branch instruction corresponding to this entry. This address is not necessary to be a whole address and may be a train of bits or the like which is part of the whole address provided that it defines the correspondence between the entry and the branch instruction.

The TAKEN counter 24b holds the number of branches successively taken until a changeover is made to the branch not taken after the branch was taken.

The NOT-TAKEN counter 24c holds the number of branches not successively taken until a changeover is again made to the branch taken after a changeover was made from the branch taken to the branch not taken.

The CURRENT counter 24d counts and holds the number of times by which the last branch direction occurred successively, represented by the CURRENT direction 24e described later.

The CURRENT direction 24e represents whether the branch was taken or not by the last execution of the branch instruction, and consists of one-bit information (flag), for example.

The CURRENT counter 24d is designed to be able to count a successive number up to m (m is an integer of 0 or more), and the TAKEN counter 24b and the NOT-TAKEN counter 24c are designed to be able to hold a value of 0 to m. Thus, m is a critical value of the CURRENT counter 24d, and when the value of the CURRENT counter 24d is "m", it means overflow from the CURRENT counter 24d.

Figure 4:
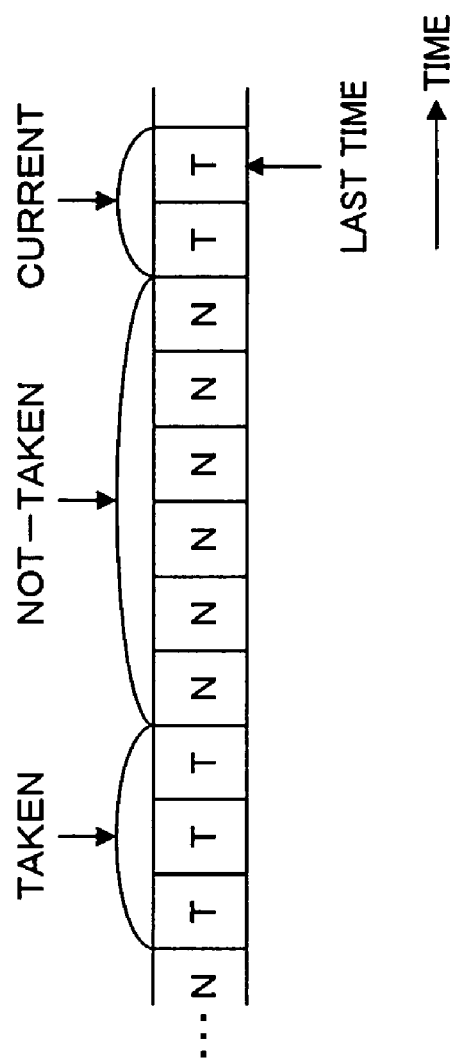
FIGS. 4(a) and 4(b) depict the configuration of a branch history held by the past branch history memory section of the global history register of the information processing apparatus which is the embodiment of the present invention.

The configuration of a branch history held by the past branch history memory section 24 will be described using an concrete example with reference to FIGS. 4(a) and 4(b). In FIG. 4(a), "T" means TAKEN (the branch is taken), and "N" means NOT TAKEN (the branch is not taken). In FIG. 4(b), "1" of the CURRENT direction 24e means that the branch was taken by the last execution of the branch instruction.

In the concrete example shown in FIGS. 4(a) and 4(b), since the branch was successively taken by the last execution and the last execution but one, the value of the CURRENT direction 24e becomes "1" and the value of the CURRENT counter 24d becomes "2". Furthermore, since the branch has been taken three times successively until a changeover is made to the branch not taken after the branch was taken, the value of the TAKEN counter 24b becomes "3", and further, thereafter, the branch has been not taken six times successively until a changeover is again made to the branch taken after the branch was not taken, whereby the value of NOT-TAKEN counter 24c becomes "6". That is, the past branch history memory section 24 holds the number of branches successively taken (the TAKEN counter 24b) and the number of branches not successively taken (the NOT-TAKEN counter 24c) until a changeover is made twice of the branch taken/the branch not taken, which signifies the branch direction of the branch instruction.

As described above, the past branch history memory section 24 of the global history register 20 does not store all of the past branch results, but stores the recent number of times by which the branches are successively taken/not taken as a branch history, thus allowing a branch history to be stored effectively, which enables the amount of required hardware (resources) to be reduced.

The branch direction predictor 25, which predicts a branch direction of the branch instruction (branch taken/branch not taken) on the basis of the branch history held by the past branch history memory section 24, predicts the next branch direction of the branch instruction on the basis of the number of branches successively taken in the TAKEN counter 24b and the number of branches not successively taken in the NOT-TAKEN counter 24c.

Furthermore, when the branch direction architecting stage determining section 26 determines that a branch history about a branch instruction, which is an object of prediction, is in an initial architecting stage (state), the branch direction predictor 25 is designed not to predict a branch direction using the above branch history.

The branch direction predictor 25 will be described in more details. In case of the concrete example shown in FIGS. 4(a) and 4(b), a changeover was made from the branch not taken to the branch taken in executing the last branch instruction but one, and the branch was taken also at the last execution. Therefore, the value of the CURRENT counter 24d becomes "2", and the CURRENT direction 24e becomes "1". In this example, the value of the TAKEN counter 24b becomes "3", so that the branch direction predictor 25 predicts that the branch would be taken next time on the condition that the branch instruction periodically repeats the number of branches successively taken held in the TAKEN counter 24b and the number of branches not successively taken held in the NOT-TAKEN counter 24c.

The branch direction architecting stage determining section 26, which determines whether or not a branch history held by the past branch history memory section 24 is in an initial architecting stage (state), determines that the branch history of the branch instruction of the entry is in an initial architecting state when either of the value of the TAKEN counter 24a or the value of the NOT-TAKEN counter 24c is "0".

The branch history register updating section 27, which updates the correspondence table 15a held in the branch history register 15 on the basis of the branch direction predicted by the branch direction predictor 25, updates the correspondence table 15a of the branch history register 15 such that it holds branch instructions by which the branch is predicted taken by the branch direction predictor 25, and updates the correspondence table 15a of the branch history register 15 such that it does not hold branch instructions by which the branch is predicted not taken by the branch direction predictor 25.

Figure 5:
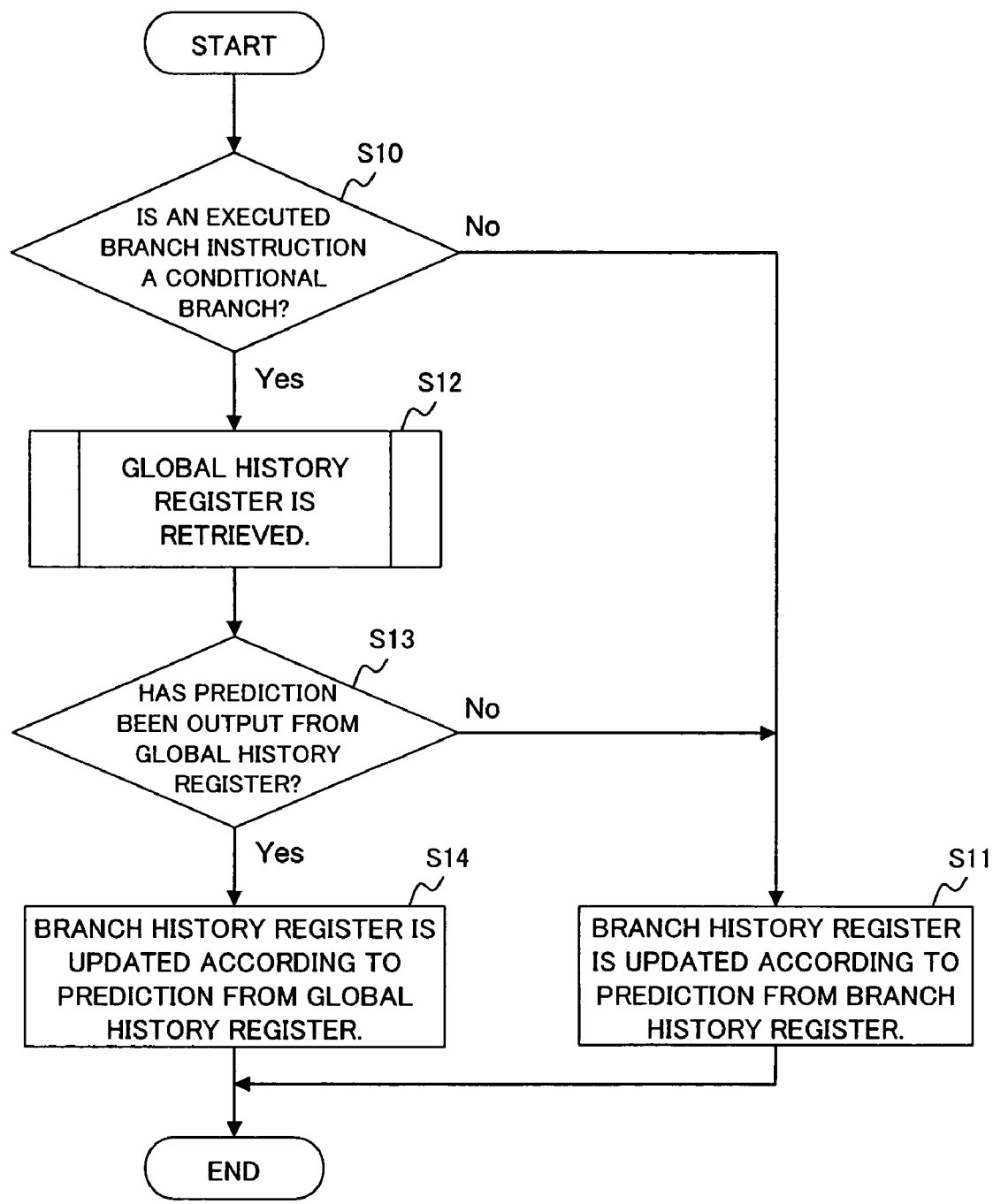
FIG. 5 is a flow chart depicting the operation procedure of the branch history updating section of the global history register of the information processing apparatus which is the embodiment of the present invention.

Herein, the operation of the branch history register updating section 27 will be described with reference to the flow chart (steps S10 to S14) shown in FIG. 5. As shown in FIG. 5, after the processing about a branch instruction by the branch instruction controller 13 has finished, it is determined whether or not the branch instruction is a conditional branch instruction. If the branch instruction is not a conditional branch instruction ("No" route of step S10), the branch history register updating section 27 does not function, and the branch history register 15 is updated based on the prediction by the branch history register 15 (step S11). If the branch instruction is a conditional branch instruction ("Yes" route of step S10), and yet if the global history register 20 has been retrieved (step S12) and a prediction has been output from the global history register 20 ("Yes" route of step S13), that is, if prediction has been performed by the branch direction predictor 25 (see steps S32, S34 and S35 in FIG. 6 described later), the branch history register updating section 27 updates the correspondence table 15a (see FIG. 2) of the branch history register 15 on the basis of the prediction by the branch direction predictor 25 (step S14). If a prediction has not been output from the global history register 20 ("No" route of step S13), the branch history register updating section 27 does not function.

Figure 6:
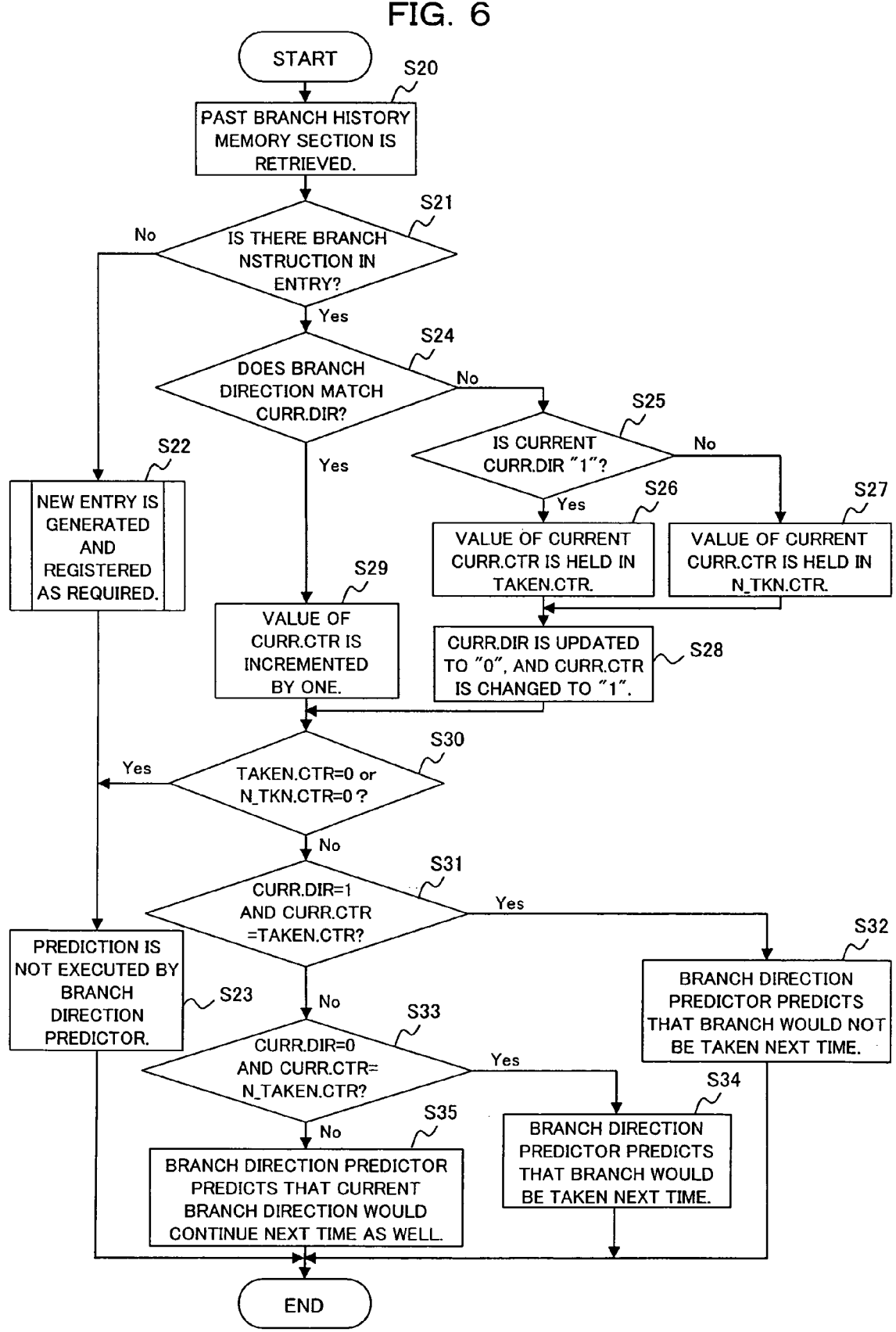
FIG. 6 is a flow chart depicting the operation procedures of the branch history updating section, branch direction predictor, and branch history architecting stage determining section of the global history register of the information processing apparatus which is the embodiment of the present invention (the procedure of the method of retrieving the past branch history memory section)

Next, the operation of the branch history updating section 21, the branch direction predictor 25, and the branch direction architecting stage determining section 26 (the procedure of retrieving the past branch history memory section 24) will be described with reference to the flow chart (steps S20 to S35) shown in FIG. 6. As shown in FIG. 6, after execution of a branch instruction, when information about the branch instruction is sent from the branch instruction controller 13 to the global history register 20, the branch history updating section 21 at first retrieves whether or not the branch instruction exists in an entry of the past branch history memory section 24 (step S20).

If the branch history of the branch instruction does not exist in an entry of the past branch history memory section 24 ("No" route of step S21), the branch history updating section 21 generates a new entry for the branch instruction as required to register it into the past branch history memory section 24 (step S22). In this operation, when the past branch history memory section 24 has an empty entry, the branch history updating section 21 registers the new entry for the branch instruction into the empty entry, while when the past branch history memory section 24 has no empty entry, the branch history updating section 21 selects one entry from the entries of the past branch history memory section 24 with the selector 22, and registers the new entry with the replacing section 23 into the entry selected with the selector 22. Details of the selector 22 and replacing section 23 will be described later with reference to FIGS. 11 to 22.

Figure 7:
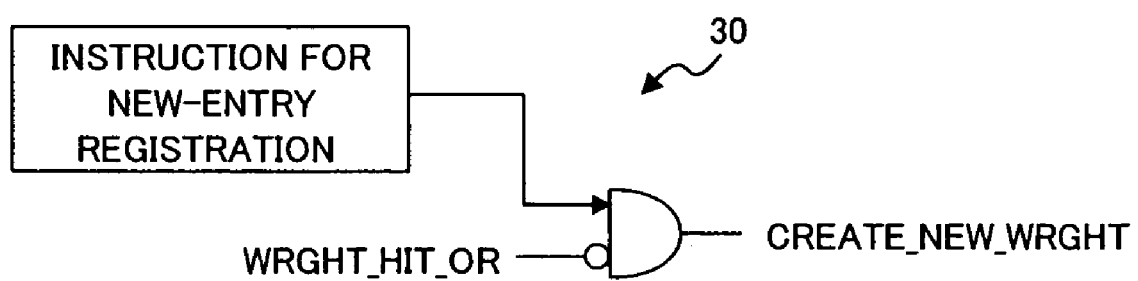
FIG. 7 shows a signal generating circuit for generating a CREATE_NEW_WRGHT signal in the information processing apparatus which is the embodiment of the present invention.

When the branch history updating section 21 generates a new entry for the branch instruction and registers it into the past branch history memory section 24 (step S22), a signal (CREATE_NEW_WRGHT signal) to register the new entry into the past branch history memory section 24 is generated by a signal generating circuit 30 shown in FIG. 7. In other words, when there is an instruction for registering a new entry into the past branch history memory section 24, which occurs when an entry for the branch instruction is registered into the branch history register 15, the CREATE_NEW_WRGHT signal is generated in case that a signal (WRGHT_HIT_OR signal) for indicating that the branch instruction has been found in an entry of the past branch history memory section 24 has not been generated (in other words, the branch history of the branch instruction does not exist in the past branch history memory section 24). In FIG. 7 and FIGS. 9, 10, 12 to 19, 21 and 22 described later, WRGHT denotes an entry of the past branch history memory section 24, and the numbers 0 to n-1 attached to the end of WRGHT denote the entries 0 to n-1 respectively.

Figure 8:
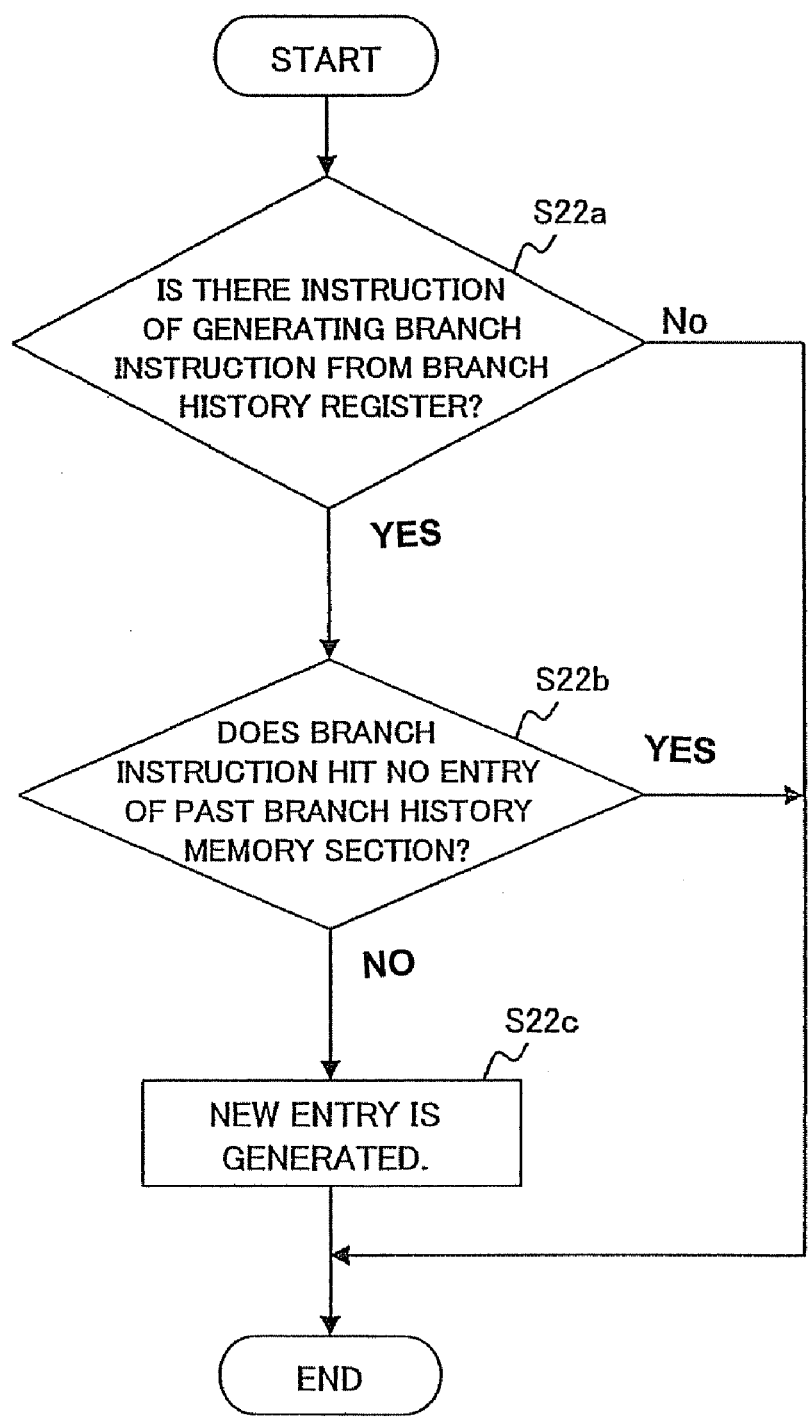
FIG. 8 is a flow chart depicting the procedure of registering a new entry to the past branch history memory section by the branch history updating section of the global history register of the information processing apparatus which is the embodiment of the present invention.

In other words, as shown in the flow chart (steps S22a to S22c) of FIG. 8, a conditional branch instruction, which is executed by the branch instruction controller 13 and then is registered into the branch history register 15, applies if an instruction for generating the branch instruction is provided from the branch history register 15 (in other words, if an entry for the conditional branch instruction is newly registered into the branch history register; "Yes" route of step S22a), and if the branch instruction hits no entry of the past branch history memory section 24 ("No" route of step S22b), the branch history updating section 21 generates a new entry for the branch instruction in the past branch history memory section 24 (step S22c).

Furthermore, as shown in FIG. 6, if an entry for the branch instruction does not exist in the past branch history memory section 24 ("No" route of step S21), prediction by the branch direction predictor 25 (i.e., prediction by the global history register) based on a branch history of the past branch history memory section 24 is not executed (step S23).

On the other hand, if an entry for the branch instruction exists in the past branch history memory section 24 ("Yes" route of step S21), the branch history updating section 21 checks whether or not the branch direction (branch taken/branch not taken) of the branch instruction included in the information about the branch instruction sent from the branch instruction controller 13 matches the branch direction indicated by the CURRENT direction 24e (step S24).

Figure 9:
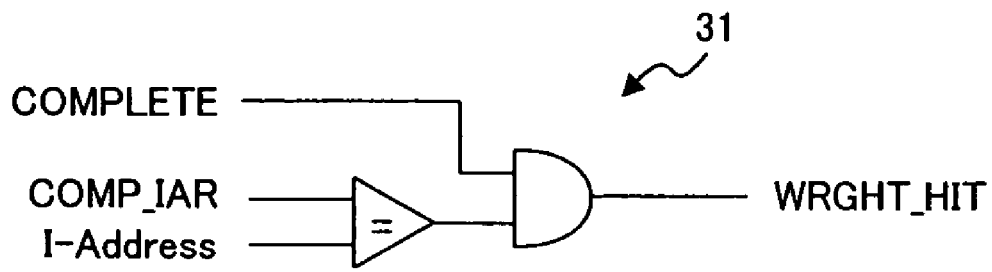
FIG. 9 shows a signal generating circuit for generating a WRGHT_HIT signal in the information processing apparatus which is the embodiment of the present invention.

If an entry for the branch instruction exists in the past branch history memory section 24 ("Yes" route of step S21), a signal (WRGHT_HIT) indicating that an entry for the branch instruction exists in the past branch history memory section 24 is generated by a signal generating circuit 31 shown in FIG. 9.

In other words, a signal (COMPLETE signal) indicating that execution of the branch instruction has been completed is generated, and a WRGHT_HIT signal is then generated when a branch instruction address (COMP_IAR) included in the COMPLETE signal matches I-Address held by the past branch history memory section 24.

Figure 10:
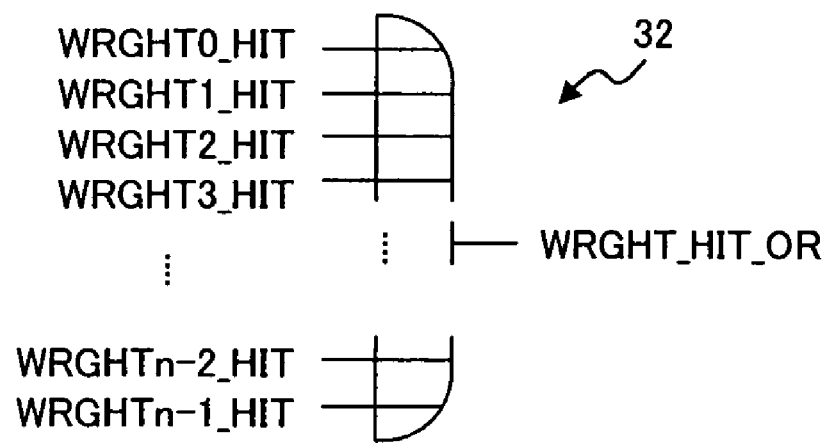
FIG. 10 shows a signal generating circuit for generating a WRGHT_HIT_OR signal in the information processing apparatus which is the embodiment of the present invention.

In addition, a signal (WRGHT_HIT_OR signal) indicating that an entry for the branch instruction has been found from any entry of the past branch history memory section 24 is generated, on the basis of the signals (WRGHT0_HIT signal to WRGHTn-1_HIT signal) from all entries 0 to n-1 of the past branch history memory section 24, by a signal generating circuit 32 shown in FIG. 10.

Furthermore, as shown in FIG. 6, if the branch direction of the branch instruction does not match the branch direction indicated by the CURRENT direction 24e ("No" route of step S24), and yet the current value of the CURRENT direction 24e (i.e., the last value of the CURRENT direction 24e before being updated to the direction of the branch instruction sent from the branch instruction controller 13) is "1" which means the branch taken ("Yes" route of step S25), the TAKEN counter 24b is caused to hold the current value of the CURRENT counter 24d (step S26), and then the CURRENT direction 24e is updated to the branch direction sent from the branch instruction controller 13 (in this case, "0" which means the branch not taken) and further, the value of the CURRENT counter is changed to "1" (step S28).

Further, if the current value of the CURRENT direction 24e is "0" which means the branch not taken ("No" route of step S25), the NOT-TAKEN counter 24c is caused to hold the current value of the CURRENT counter 24d (step S27), and then the CURRENT direction 24e is updated to the branch direction sent from the branch instruction controller 13 (in this case, "1" which means the branch taken) and the value of the CURRENT counter 24d is changed to "1" (step S28).

If the branch direction (the branch taken/branch not taken) of the branch instruction sent from the branch instruction controller 13 matches the branch direction indicated by the CURRENT direction 24e ("Yes" route of step S24), the value of the CURRENT counter 24d is incremented by one, keeping the branch direction indicated by the CURRENT direction 24e as it is (step S29).

Next, the branch direction architecting stage determining section 26 determines whether or not the branch history of the branch instruction is in an initial architecting stage (step S30). In other words, the branch direction architecting stage determining section 26 determines whether or not at least one of the value of the TAKEN counter 24b and the value of the NOT-TAKEN counter 24c in the branch history of the branch instruction is "0". If the branch direction architecting stage determining section 26 determines that at least one of the value of the TAKEN counter 24b and the value of the NOT-TAKEN counter 24c is "0" (i.e., the branch history is in an initial architecting stage) ("Yes" route of step S30), prediction about the next branch direction of the branch instruction is not executed by the branch direction predictor 25 (step S23).

However, if the branch direction architecting stage determining section 26 determines that any of the value of the TAKEN counter 24b and the value of the NOT-TAKEN counter 24c is not "0" (i.e., the branch history is not in an initial architecting stage) ("No" route of step S30), prediction about the next branch direction of the branch instruction is executed by the branch direction predictor 25 (steps S31 to S35).

In other words, the branch direction predictor 25 determines whether the value of the CURRENT direction 24e after updating by the branch history updating section 21 is "1" (i.e., the branch taken) (step 28 or step 29), and yet whether or not the value of the CURRENT counter 24d matches the value of the TAKEN counter 24b (step S31). If the both conditions are satisfied ("Yes" route of step S31), the branch direction predictor 25 predicts that the branch would not be taken by the next execution of the branch instruction (step S32).

On the other hand, if both conditions are not satisfied ("No" route of step S31), the branch direction predictor 25 determines whether the value of the CURRENT direction 24e after updating by the branch history updating section 21 is "0" (i.e., the branch not taken), and yet whether or not the value of the CURRENT counter 24d matches the value of the NOT-TAKEN counter 24c (step S33). If the branch direction predictor 25 determines that the both conditions are satisfied ("Yes" route of step S33), the branch direction predictor 25 predicts that the branch would be taken by the next execution of the branch instruction (step S34).

If the branch direction predictor 25 determines, also in this step (step S33), that the both conditions are not satisfied ("No" route of step S33), the branch direction predictor 25 predicts that the branch instruction would continue to keep the current branch direction (the branch direction after updated) next time as well (in other words, the next branch direction would be identical to the current branch direction) (step S35).

Like this, the branch direction predictor 25 predicts a branch direction of a branch instruction on the basis of a branch history (see FIG. 3) held in the past branch history memory section 25 (steps S32, S34, and S35).

Next, the selector 22 and replacing section 23 of the branch history updating section 21 will be described.

The selector 22, which selects one entry in n entries 0 to n-1 of the past branch history memory section 24 in case that all of the n entries 0 to n-1 are in use when the branch history updating section 21 registers a branch history about a new branch instruction into the past branch history memory section 24 (see FIG. 8), has two functions, a first selecting function and a second selection function described later.

The first selecting function of the selector 22 is a function of selecting one entry in n entries 0 to n-1 of the past branch history memory section 24 on the basis of the branch history of the past branch history memory section 24 in case that all of the n entries 0 to n-1 are in use when a branch history about a new branch instruction is registered into the past branch history memory section 24. Specifically, the selector 22 selects one entry in which the branch history held by the branch history memory section 24 includes only branches taken, and yet the number of branches successively taken included in the branch history is equal to or more than a predetermined number (m in this embodiment).

Which is, the first selecting function of the selector 22 is a function of selecting an entry having a branch history in which any of the value of the TAKEN counter 24b and the value of the NOT-TAKEN counter 24c is "0", the CURRENT direction 24e indicates "1", and further, the CURRENT counter 24d indicates "m".

Figure 11:
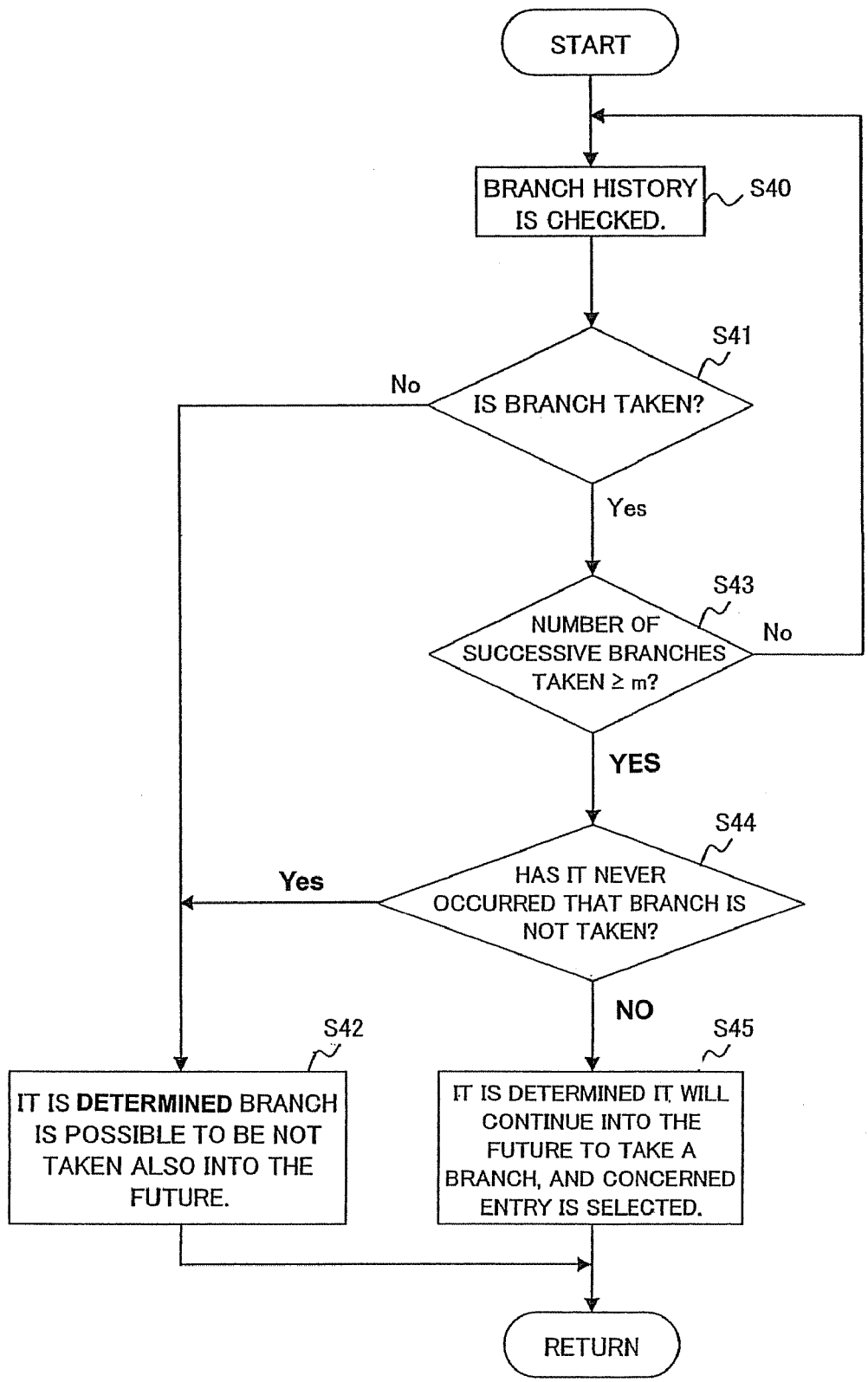
FIG. 11 is a flow chart depicting the procedure of selecting an entry with the first selecting function of the selector of the branch history updating section of the information processing apparatus which is the embodiment of the present invention.

The procedure of selecting an entry, which is an object of replacement, with the first selecting function of the selector 22 (first selecting step) will be described with reference to the flow chart (steps S40 to S45) shown in FIG. 11. As shown in FIG. 11, the first selecting function of the selector 22 is a function of checking the branch histories of all entries 0 to n-1 of the past branch history memory section 24 in case that all the entries are in use when a branch history about a new branch instruction is registered into an entry of the past branch history memory section 24 (step S40).

Figure 12:
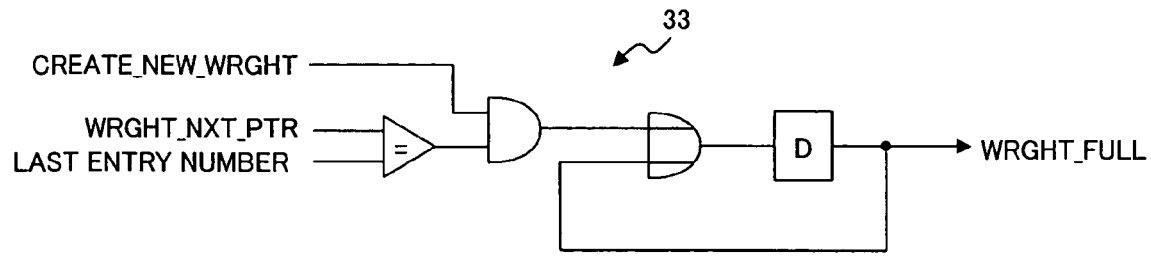
FIG. 12 shows a signal generating circuit for generating a WRGHT_FULL signal in the information processing apparatus which is the embodiment of the present invention.

The selector 22 determines whether or not all entries 0 to n-1 of the past branch history memory section 24 are in use, by means of a signal (WRGHT_FULL signal) indicating that all the entries 0 to n-1 of the past branch history memory section 24 are in use, which has been generated by a signal generating circuit 33 shown in FIG. 12. The WRGHT_FULL signal is generated as shown in FIG. 12 in case that the number of an entry designated by a pointer (WRGHT_NEXT_PTR) generated to register a branch history into an entry selected in the order of the entries 0 to n-1 by the second selecting function of the selector 22 described later matches the number of the last entry (i.e., n-1), when a signal of instruction for new entry registration (CREATE_NEW_WRGHT signal) is generated.

As shown in FIG. 11, with the first selecting function of the selector 22, it is at first determined whether or not the current branch direction indicated by the CURRENT direction 24e signifies the branch taken ("1") (step S41). Herein, if the branch direction signifies the branch not taken (the value of the CURRENT direction 24e is "0") ("No" route of step S41), it is determined that the branch is possible not to be taken also into the future, so the entry of this branch history is not selected (step S42). In other words, it is determined that the entry of this branch history is necessary to change the prediction of the branch history register 15

On the other hand, if the branch direction signifies the branch taken (the value of the CURRENT direction 24e is "1") ("Yes" route of step S41), it is determined whether or not the number of branches successively taken of the CURRENT counter 24d exceeds a predetermined number (m in this embodiment) (step S43).

Herein, if the number of branches successively taken has not exceeded a predetermined number ("No" route of step S43), the entry of this branch history is not selected, and then the process is returned to the above step S40.

If the number of branches successively taken has exceeded a predetermined number ("Yes" route of step S43), it is determined whether or not the value of the NOT-TAKEN counter 24c of this branch history is "0", which is, whether or not the branch not taken has never occurred (step S44).

Figure 13:
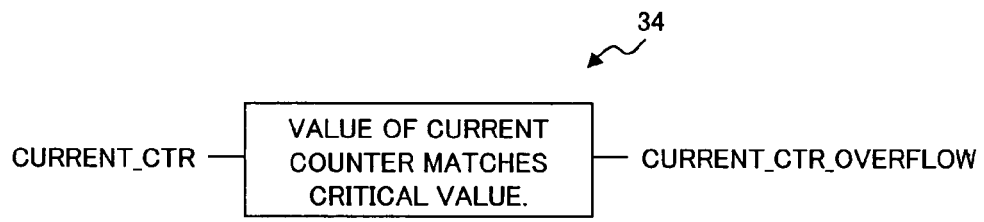
FIG. 13 shows a signal generating circuit for generating a CURRENT_CRT_OVERFLOW signal in the information processing apparatus which is the embodiment of the present invention.

In this connection, when the number of branches successively taken matches the predetermined value (critical value; m), a CURRENT_CTR_OVERFLOW signal indicating that the value held in the CURRENT counter 24d has become equal to or more than the predetermined value (m), which is, overflow from the CURRENT counter 24d, is generated by a signal generating circuit 34 shown in FIG. 13.

If the NOT-TAKEN counter 24c indicates a value other than "0" ("Yes" route of step S44), it is determined that the branch is possible not to be taken also into the future, so the entry of this branch history is not selected (step S42).

On the other hand, if the NOT-TAKEN counter 24c indicates "0" ("No" route of step S44), it is thought that the branch taken will continue also into the future, and it is determined that it is not necessary to change the prediction about this branch history in the branch history register 15, so the entry of this branch history is selected as an entry, which is object of replacement (step S45).

Figure 14:
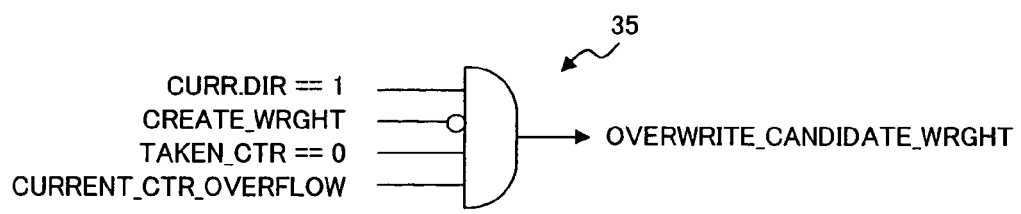
FIG. 14 shows a signal generating circuit for generating an OVERWRITE_CANDIDATE_WRGHT signal in the information processing apparatus which is the embodiment of the present inventionl.

In other words, as shown in a signal generating circuit 35 of FIG. 14, when the CURRENT direction indicates "1", yet a new-registration signal (CREATE_WRGHT signal) for this entry is not generated, yet the TAKEN counter 24b indicates "0", and yet a signal (CURRENT_CTR_OVERFLOW signal; see FIG. 13) indicating overflow from the CURRENT counter 24d is generated, an OVERWRITE_CANDIDATE_WRGHT signal for making the entry of this branch history an entry, which is an object of replacement (object of overwrite) is generated.

Figure 15:
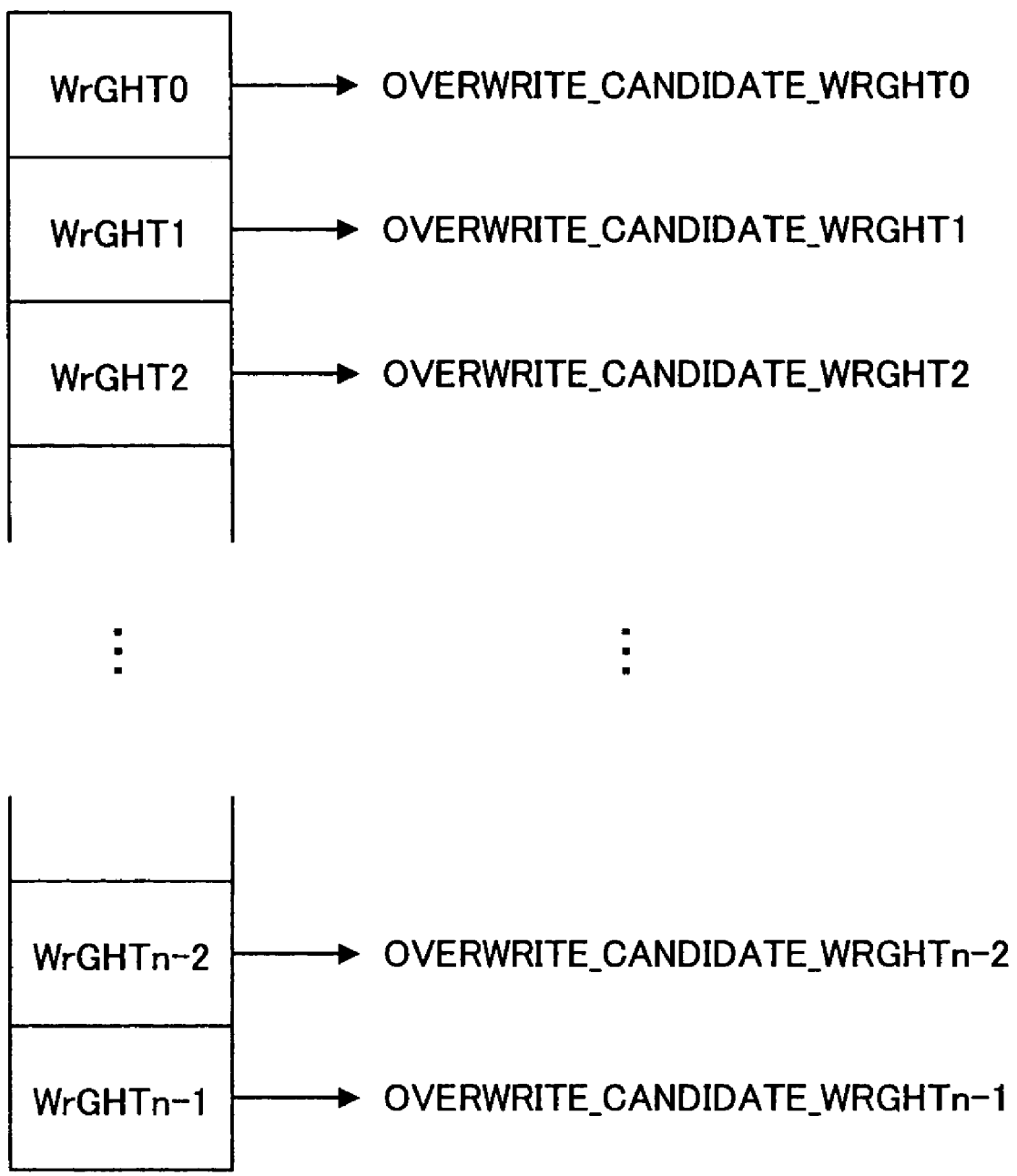
FIG. 15 depicts that an OVERWRITE_CANDIDATE_WRGHT signal is generated from all entries in the past branch history memory section of the global history register of the information processing apparatus which is the embodiment of the present invention.

The OVERWRITE_CANDIDATE_WRGHT signal can be generated for each of all entries 0 to n-1 of the past branch history memory section 24 as shown in FIG. 15

Figure 16:
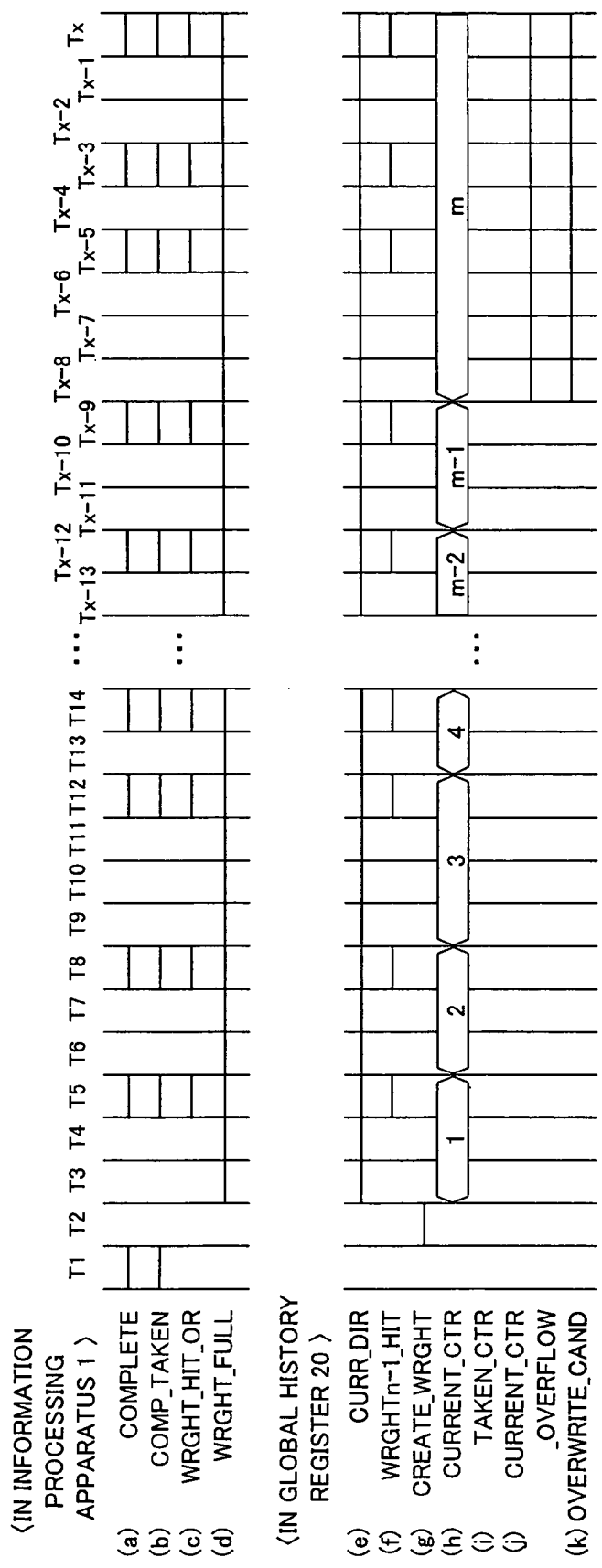
FIG. 16 is a time chart depicting the process executed until a CURRENT_CTR_OVERFLOW signal is generated from the past branch history memory section of the global history register of the information processing apparatus which is the embodiment of the present invention.

Herein, the process executed until the CURRENT_CTR_OVERFLOW signal is generated in the information processing apparatus 1 will be described with reference to the time chart shown in FIGS. 16(a) to (k). In FIG. 16, T1 to Tx are units of time for the processing of the information processing apparatus 1

As shown in FIG. 16, when the COMPLETE signal and a signal indicating that the branch of the executed branch instruction has been taken (COMP_TAKEN signal) are generated from the branch instruction controller 13 (see T1), a signal of instruction for new entry registration (CREATE_WRIGHT signal) is generated in the global history register 20 (see T2).

Herein, it is assumed that a branch history has been registered into the entry n-1, the value of the CURRENT counter 24d (denoted as CURRENT_CTR in the figure) in the branch history of the entry n-1 is incremented to "1", and the value of the CURRENT direction 24e (denoted as CURRENT_DTR in the figure) becomes "1" (the flag comes into ON state) (see T3). Additionally, at this point in this time chart, all entries 0 to n-1 of the past branch history memory section 24 result in having been used, whereby a WRGHT_FULL signal (see FIG. 12) is also generated (see T3). This WRGHT_FULL signal continues to be generated into the future.

After that, when the same branch instruction is executed again, the COMPLETE signal is generated (see T5). However, since the branch history of the branch instruction has been already held in the entry n-1, a WRGHT_HIT_OR signal indicating that the branch history about the branch instruction has been held in the past branch history memory section 24 is generated, and a WRGHTn-1_HIT signal indicating that the branch instruction has hit the entry n-1 is also generated (see T5).

Furthermore, when the branch of the branch instruction is taken this time too, the COMP_TAKEN signal is generated (see T5), and the value of the CURRENT counter 24d of the entry n-1 holding the branch history about the branch instruction is incremented to "2" (see T6).

In addition, also after that, when the branch instruction is executed and the branch is taken, an operation similar to the operation at T5 and T6 is repeated (see T7 to Tx-10).

When the branch instruction has been successively executed m times and the branch has been taken each time (see Tx-9), the value of the CURRENT counter 24d of the entry n-1 is incremented to "m", and the CURRENT_CTR_OVERFLOW signal is generated from the past branch history memory section 24, and a replaced-candidate signal (OVERWRITE_CANDIDATE_WRGHTn-1 signal; denoted as OVERWRITE_CAND) is further generated in order to use the entry n-1 when replacement is performed (see Tx-8).

After that, even if the branch instruction is executed and the branch is taken (see Tx-5, Tx-3, and Tx), the CURRENT counter 24d is not incremented (see Tx-4 and Tx-2), and the CURRENT_CTR_OVERFLOW signal and the OVER- WRITE_CANDIDATE_WRGHTn-1 signal continue to be generated unless replacement is performed with this entry n-1 assumed to be an object (see Tx-7 to Tx).

In this connection, it happens that a plurality of entries which can be selected as a candidate for replacement with the first selecting function of the selector 22 exist at the same time in the entries 0 to n-1 of the past branch history memory section 24. However, the first selecting function is so designed to select one entry ranked highest in the order of the entry 0 to the entry n-1 as an entry, which is an object of replacement, even if a plurality of entries in which the number of branches successively taken included in the branch history is equal to or more than a predetermined number exist at the same time.

FIGS. 17(a) to (f) depict the procedure of selecting one entry with the first selecting function of the selector 22. As shown in FIGS. 17(a) to (f), with the first selecting function of the selector 22, it is checked in the order of the entry 0 to the entry n-1 whether the replaced-candidate signal (OVERWRITE_CANDIDATE_WRGHT signal) has been output, and at the time when a replaced-candidate signal was detected, an entry from which the detected replaced-candidate signal was output is selected as an entry, which is an object of replacement.

Figure 17A:
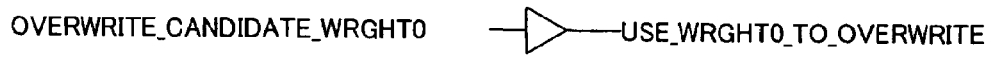
FIGS. 17(a) to 17(f) depict the technique of selecting one entry with the first selecting function of the selector of the branch history updating section of the information processing apparatus which is the embodiment of the present invention.
Figure 17B:
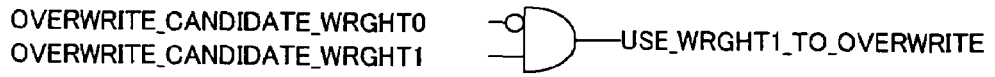

In other words, as shown in FIG. 17(a), with the first selecting function of the selector 22, in case that the replaced-candidate signal (OVERWRITE_CANDIDATE_WRGHT0) was output from the entry 0, this entry 0 is selected as an entry, which an object of replacement. Furthermore, as shown in FIG. 17(b), in case that the replaced-candidate signal was not output from the entry 0 but the replaced-candidate signal (OVERWRITE_CANDIDATE_WRGHT1 signal) was output from the entry 1, the entry 1 is selected as an entry, which an object of replacement, and a signal (USE_WRGHT1_OVERWRITE signal) used to replace the entry 1 is generated.

Figure 17C:
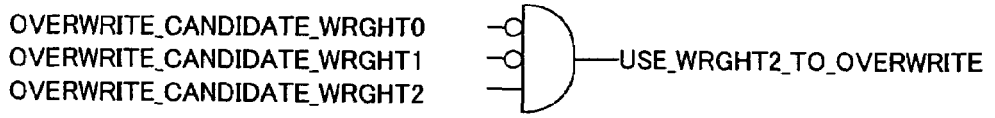
Figure 17D:
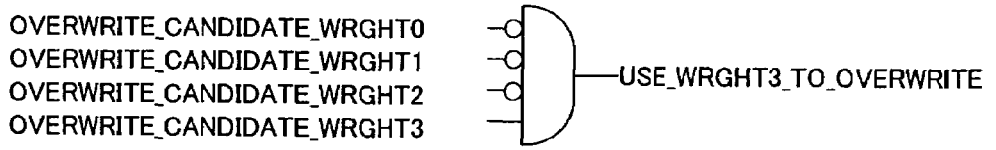
Figure 17E:
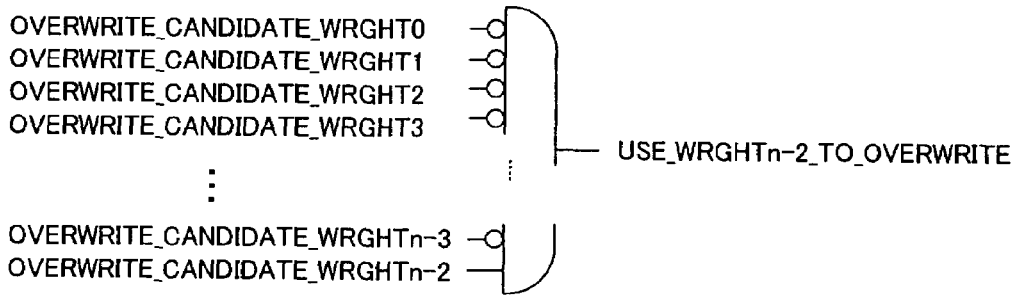
Figure 17F:
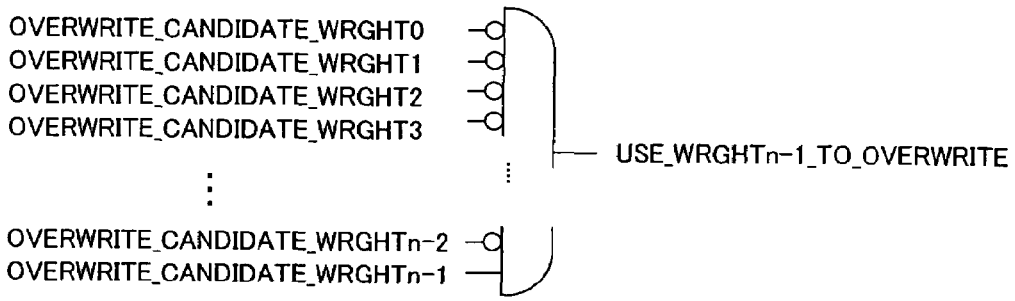

Furthermore, as shown in FIG. 17(c), in case that the replaced-candidate signal has been not output from the entry 0 and the entry 1, but the replaced-candidate signal (OVERWRITE_CANDIDATE_WRGHT2 signal) has been output from the entry 2, the entry 2 is selected as an entry, which is an object of replacement, and the signal (USE_WRGHT2_OVERWRITE signal) used to replace the entry 2 is generated. In FIGS. 17(d) to (f), a procedure similar to the procedures in FIGS. 17 (a) to (c) is used.

The second selecting function of the selector 22 is a function of selecting one entry registered earliest in n entries 0 to n-1 of the past branch history memory section 24 in case that all the entries 0 to n-1 are in use when a branch history about a new branch instruction is registered. In other words, the second selecting function of the selector 22 is a function of selecting an entry, which is an object of replacement, in the round-robin method.

Figure 18:
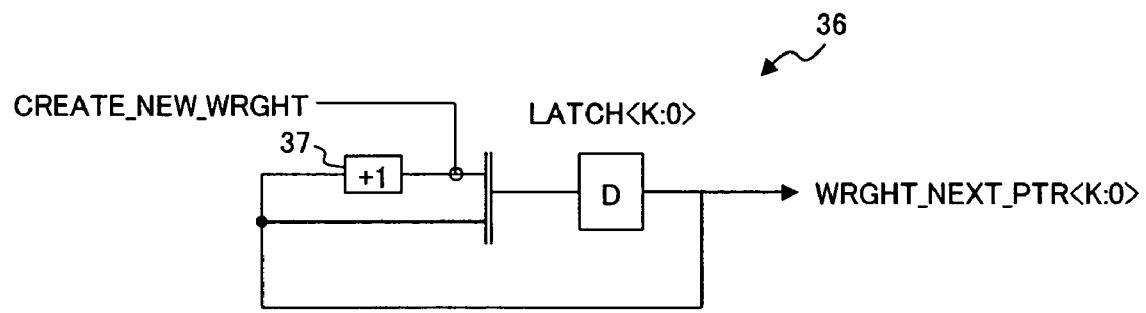
FIG. 18 shows a signal generating circuit for generating a WRGHT_NEXT_PTR<K:0> signal in the information processing apparatus which is the embodiment of the present invention.

With the second selecting function of the selector 22, a pointer (WRGHT_NEXT_PTR<K:0>) for selecting an entry, which is an object of replacement, is generated by a signal generating circuit 36 shown in FIG. 18. In other words, when an instruction for new entry registration (CREATE_NEW_WRGHT) is generated, the pointer is generated by incrementing the value of the counter 37 one by one.

Figure 19:
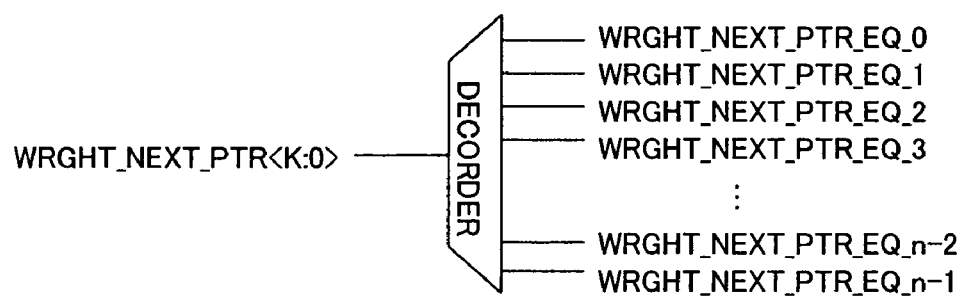
FIG. 19 depicts a WRGHT_NEXT_PTR<K:0> signal generated in the information processing apparatus which is the embodiment of the present invention.

In this connection, as shown in FIG. 19, signals (WRGHT_NEXT_PTR_EQ_0 to WRGHT_NEXT_PTR_EQ_n-1) for selecting the entries 0 to n-1 can be obtained by decoding this WRGHT_NEXT_PTR<K:0> with the decoder 31.

The replacing section 23 registers a branch history about a new branch instruction into one entry selected by the selector 22.

Figure 20:
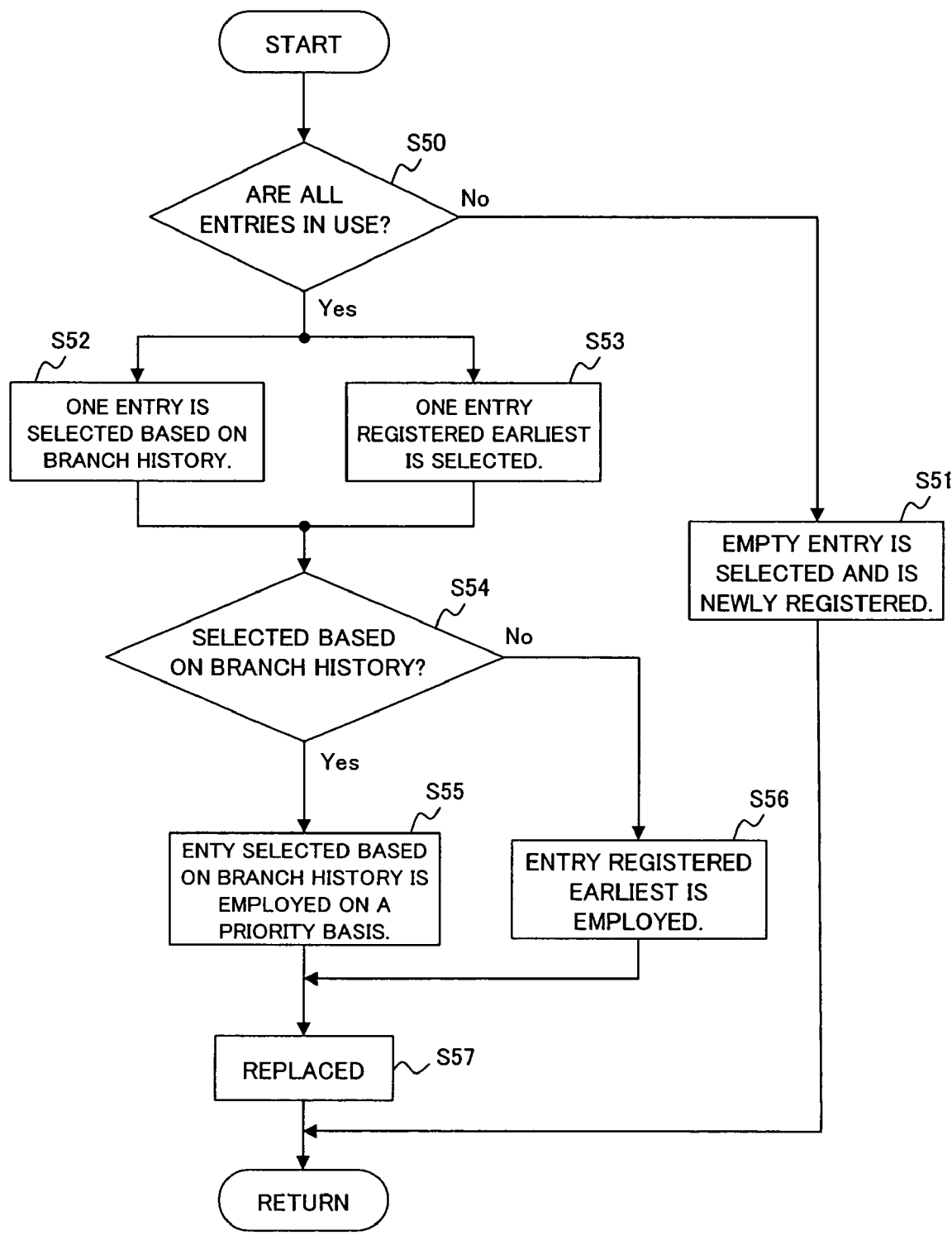
FIG. 20 is a flow chart depicting the procedure of a replacing method which is the embodiment of the present invention.

Next, the procedure of a replacing method, which is one embodiment of the present invention, will be described with reference to the flow chart (steps S50 to S57) shown in FIG. 20. As shown in FIG. 20, when a branch history about a new branch instruction is registered into an entry of the past branch history memory section 24, the selector 22 at first determines whether or not all entries 0 to n-1 of the past branch history memory section 24 are in use (step S50). If all the entries are not in use ("No" route of step S50), the branch history updating section 21 selects an empty entry which is not in current use in the round-robin method, and registers a branch history about a new branch instruction into the selected entry (step S51).

On the other hand, if all the entries are in use ("Yes" route of step S50), the selector 22 selects an entry on the basis of the branch histories held in the past branch history memory section 24 with the first selecting function as described above with reference to FIG. 11 (first selecting step; step S52). In other words, when a branch history exists in which only the branch taken was registered until now and yet the number of branches successively taken is equal to or more than a predetermined number (m), the entry of this branch history is selected as an entry, which is an objection of replacement.

Furthermore, if all the entries are in use ("Yes" route of step S50), the selector 22 selects an entry registered earliest of all the entries 0 to n-1 as an entry, which is an objection of replacement, in the round-robin method with the second selecting function (second selecting step; step S53).

If a branch history exists in which only the branch taken was registered until now and yet the number of branches successively taken is equal to or more than a predetermined number (m), and one entry has been selected with the first selecting function in the first selecting step (step S52) ("Yes" route of step S54), the selector 22 employs one entry selected on the basis of the branch histories in this first selecting step on a higher priority basis than one entry selected with the second selecting function in the second selecting step (step S55), and then the replacing section 23 registers a branch history about a new branch instruction into one entry selected (employed) in the first selecting step (replacing step; step S57).

If a branch history does not exist in which only the branch taken was registered until now and yet the number of branches successively taken is equal to or more than a predetermined number (m), and one entry has not been selected with the first selecting function in the first selecting step (step S52) ("No" route of step S54), the selector 22 employs an entry registered earliest selected with the second selecting function in the second selecting step (step S56), and then the replacing section 23 registers a branch history about a new branch instruction into one entry selected (employed) in the second selecting step (replacing step; step S57).

In this connection, steps S51 and S53 to S57 in FIG. 20 function as selecting steps.

Figure 21:
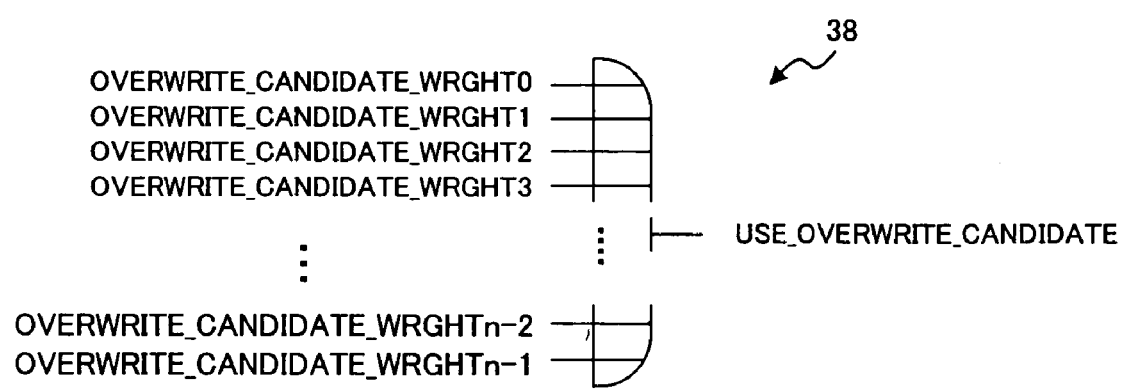
FIG. 21 shows a signal generating circuit for generating a USE_OVERWRITE_CANDIDATE signal in the information processing apparatus which is the embodiment of the present invention.

Furthermore, with the first selecting function of the selector 22, a signal (USE_OVERWRITE_CANDIDATE signal) allowing one entry selected with the first selecting function to be employed is generated by a signal generating circuit 38 shown in FIG. 21. In other words, when the replaced-candidate signal (OVERWRITE_CANDIDATE_WRGHT) is output from any one of the entries 0 to n-1, the USE_OVERWRITE_CANDIDATE signal is generated.

Figure 22:
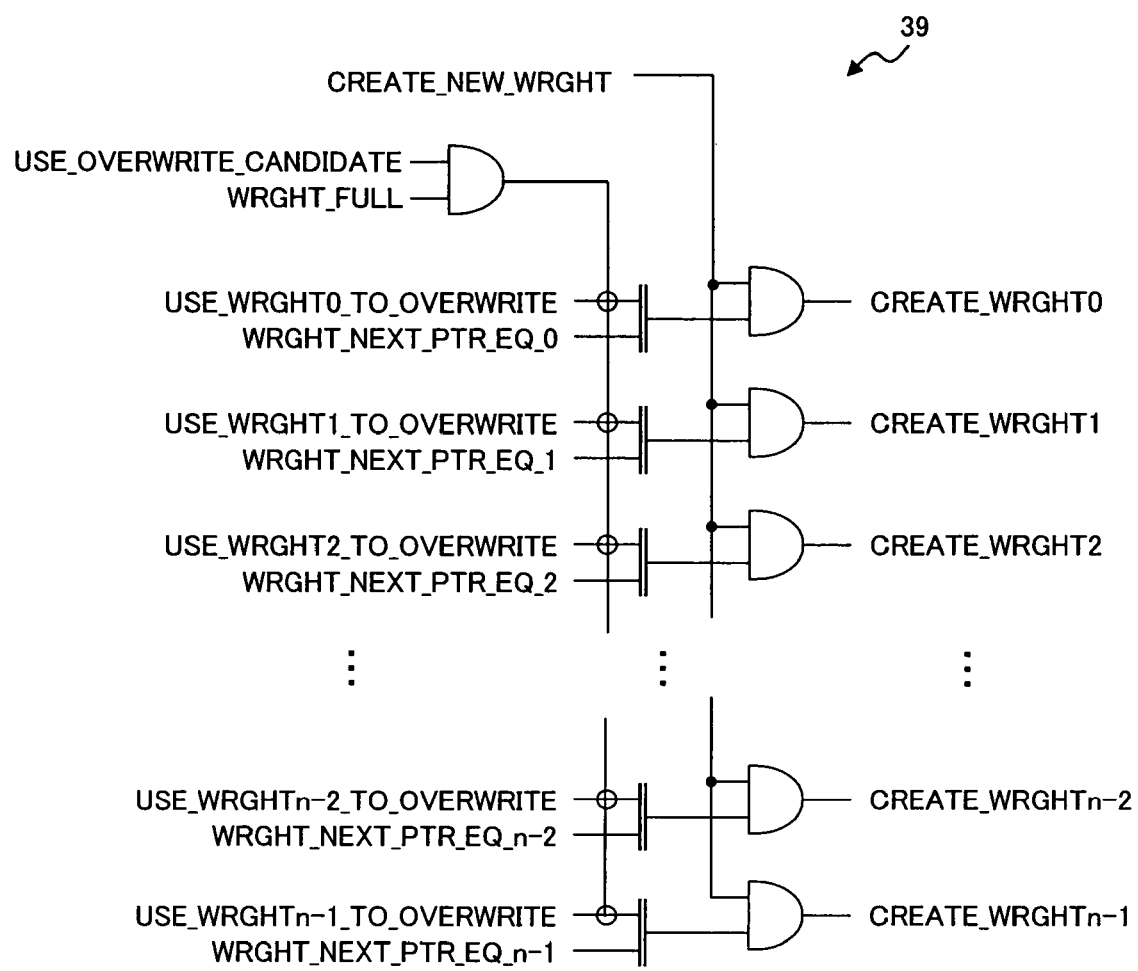
FIG. 22 depicts a signal generating circuit for generating a CREATE_WRGHT signal in the information processing apparatus which is the embodiment of the present invention.

The selector 22 employs, using a signal generating circuit 39 shown in FIG. 22, one entry selected with the first selecting function (first selecting step) on a priority basis. In other words, even if the USE_WRGHT_TO_OVERWRITE signal (see FIG. 17) and the WRGHT_NEXT_PTR_EQ signal (see FIG. 19) have been generated in each of the entries 0 to n-1, when the USE_OVERWRITE_CANDIDATE signal (see FIG. 21) and the WRGHT_FULL signal (see FIG. 12) have been generated with the first selecting function, these signals generated with the first selecting function are employed. The selected signals and the instruction for new entry registration (CREATE_NEW_WRGHT signal; see FIG. 7) then allow CREATE_WRGHT0 to CREATE_WRGHTn-1 signals for registering a new entry (branch history) into each of the entries 0 to n-1 to be generated.

As described above, the information processing apparatus 1 and replacing method, which is one embodiment of the present invention, enables the selector 22 of the branch history updating section 21 to select an entry of the entries of the past branch history memory section 24, which does not affect prediction about a branch direction of a branch instruction without its entry, without specially holding new information for replacement by the past branch history memory section 24, using only information (i.e., I-Address 24a, TAKEN counter 24b, NOT-TAKEN counter 24c, CURRENT counter 24d, and CURRENT direction 24e) originally provided in the past branch history memory section 24 to be used for prediction, thereby allowing the limited resources to be effectively used and effective replacement to be realized.

Specifically, the selector 22 selects a branch history in which only branches taken is included since newly registered in an entry of the past branch history memory section 24 and yet the number of the branches taken is more than a predetermined number (critical value), thereby making it possible to select an entry (branch history) about a branch instruction unnecessary for branch prediction, by which the branch taken is thought to continue also into the future, as an objection of replacement, on a priority basis, which enables the entries 0 to n-1 of the past branch history memory section 24 to be effectively used, and the prediction accuracy (performance) of the global history register 20 to be improved.

[2] Others

The present invention is not limited to the embodiment described above, and may be embodied with various variations without departing from the spirit and scope of the invention.

For example, the embodiment described above is configured so that the second selecting function of the selector 22 is a function of selecting an entry, which is an object of replacement, of the plurality of entries of the past branch history memory section 24 with the round-robin method. However, the present invention is not limited to this configuration, and may be configured so that the second selecting function of the selector 22 is a function of selecting an entry, which is an object of replacement, of the plurality of entries in the past branch history memory section 24 with the LRU method. In other word, the present invention may be configured so that the second selecting function of the selector 22 is a function of selecting an entry used earliest for prediction by the branch direction predictor 25, of all entries of the past branch history memory section 24, thereby allowing an effect similar to that of the embodiment described above to be produced. In this case, a configuration has to be made so that histories such as times when the branch history was used (updated) are held in the branch history of the past branch history memory section 24.

Furthermore, the embodiment described above is configured so that the first selecting function of the selector 22 is a function of selecting one entry ranked highest in the order of the entry 0 to the entry n-1 as an entry, which is an object of replacement even if a plurality of entries exist at the same time in which only branches taken is included since registered in the past branch history memory section 24 and yet the number of branches taken included in the branch history is equal to or more than a predetermined number. However, the present invention is not limited to this configuration, and may be configured so that when a plurality of entries were selected with the first selecting function of the selector 22, one entry is selected from the selected plurality of entries with the second selecting function of the selector 22.

Furthermore, in the embodiment described above, when one entry, which is an object of replacement, is selected with the first selecting function of the selector 22, a pointer (see FIGS. 18 and 19) for selecting one entry selected with the second selecting function is not updated, whereby when the entry selected with the first selecting function matches the entry selected with the second selecting function, there is a possibility that the entry is replaced with the first selecting function and then is replaced again with the second selecting function. Therefore, it may be designed that in such a case a pointer generated with the second selecting function is incremented.

Furthermore, the embodiment described above may be configured so that the branch instruction about the entry selected and replaced by the selector 22 is not registered again into the past branch history memory section 24. For example, the embodiment described above may be configured so that the branch RS 14 holds, every branch instruction, information (flag, etc.) indicating that the instruction was registered once but has been erased for replacement, and that the selector 22 selects an entry, which is an object of replacement, on the basis of such information.

In the embodiment described above, a case was explained that the replacing method of the present invention was applied to the past branch history memory section 24 of the global history register. However, application of the replacing method of the present invention is not limited to the past branch history memory section 24 of the global history register. For example, in various full-associative memory devices, the replacing method may be applied in case that an entry is replaced when all entries are in use, and may provide the same work and effect as those in the embodiment described above.

For example, in a translation lookaside buffer (TLB) or the like used for address conversion, there may be means for decreasing the order of priority when a global bit which means that an entry can be used commonly in a whole process space is on. Further, when a context used for identifying a process space does not represents a space currently executed, it is considered that the frequency of use of the context is low, and therefore there may be a means for replacing the context on a priority basis or the like.

Furthermore, the functions of the aforementioned instruction fetch address generator 10, instruction fetch section 11, instruction decoder 12, branch instruction controller 13, branch RS14, branch history register 15, branch history updating section 21, selector 22, replacing section 23, past branch history memory section 24, I-Address 24a, TAKEN counter 24b, NOT-TAKEN counter 24c, CURRENT counter 24d, CURRENT direction 24e, branch direction predictor 25, branch direction architecting stage determining section 26, and branch history register updating section 27 may be realized by that a computer (including a CPU, an information processing apparatus, and various terminals) executes a predetermined application program (replacing program).

The program is provided in the form of being recorded on a computer-readable recording medium such as a flexible disk, a CD-ROM, a CD-R, a CD-RW, a DVD, or the like. In this case, the computer reads a storing instruction control program from its recording medium, which is transferred to an internal memory device or an external memory device, stored and used. Furthermore, the program may be recorded in memory devices (recording medium) such as a magnetic disk, an optical disk, and a magneto-optical disk, and provided to the computer through a communication line from the memory device.

Herein, the so-called computer, which is a concept including hardware and an operating system (OS), signifies the hardware operating under the control of the OS. In case that an OS is not required and the hardware is caused to operate with an application program only, the hardware itself corresponds to the computer. The hardware is provided with at least a microprocessor such as a CPU, and means for reading a computer program recorded on the recording medium. The application program which is the replacing program described above includes program codes for allowing a computer as described above to realize the functions of the instruction fetch address generator 10, the instruction fetch section 11, the instruction decoder 12, the branch instruction controller 13, the branch RS 14, the branch history register 15, the branch history updating section 21, the selector 22, the replacing section 23, the past branch history memory section 24, the I-Address 24a, the TAKEN counter 24b, the NOT-TAKEN counter 24c, the CURRENT counter 24d, the CURRENT direction 24e, the branch direction predictor 25, the branch direction architecting stage determining section 26, and the branch history register updating section 27. Further, part of the functions may be realized not with an application program but with an OS In addition, as a recording medium which is this embodiment, various computer-readable mediums such as an IC card, a ROM cartridge, a magnetic tape, a punched card, an internal memory device (memories such as a RAM and a ROM) and an external memory device, etc. of a computer may be used, in addition to the flexible disk, the CD-ROM, the CD-R, the CD-RW, the DVD, the magnetic disk, the optical disk, and the magneto-optical disk described above.

What is claimed is:

1. An information processing apparatus comprising:
    a branch history register for holding, in order to predict a branch destination of a branch instruction, a correspondence table providing the correspondence between an address of said branch instruction and an address of the predicted branch destination of said branch instruction;
    a past branch history memory section for holding past branch directions of said branch instruction as a branch history;
    a branch direction predictor for predicting a branch direction of said branch instruction on the basis of said branch history held by said past branch history memory section;
    a branch history register updating section updating said correspondence table held by said branch history register on the basis of the branch direction predicted by said branch direction predictor;
    a selector for selecting one entry from all entries of said past branch history memory section if a plurality of the branch histories use all entries of said past branch history memory section when a branch history about a new branch instruction is being registered into said past branch history memory section; and
    a replacing section for replacing the branch history registered in said one entry selected by said selector with the branch history about said new branch instruction,
    said selector comprising a first selection function of selecting, as said one entry, if past branch directions exist in the past branch history memory section, an entry in which said branch history held by said past branch history memory section includes only branches taken and in which the number of branches taken included in said branch history held by said past branch history memory section is equal to or more than a predetermined number.

2. The information processing apparatus according to claim 1, wherein said selector has a second selecting function of selecting, as said one entry, an entry registered earliest of all entries of said past branch history memory section, and employs an entry selected with said first selecting function on a higher priority basis than an entry selected with said second selecting function.

3. An information processing apparatus according to claim 1, wherein said selector has a second selecting function of selecting, as said one entry, an entry used earliest for prediction by said branch direction predictor of all entries of said past branch history memory section, and employs an entry selected with said first selecting function on a higher priority basis than an entry selected with said second selecting function.

4. An information processing apparatus according to claim 1, wherein:
    said past branch history memory section holds, as said branch history, the number of branches, which were successively taken, and the number of branches, which were not successively taken until a changeover is made twice of the branch taken/the branch not taken, which signifies said branch direction of said branch instruction; and
    said branch direction predictor predicts the branch taken/the branch not taken, which is said branch direction of said branch instruction, on the basis of said number of branches successively taken and said number of branches not successively taken.

5. The information processing apparatus according to claim 1, further comprising a branch history architecting state determining section for determining whether or not said branch history held by said past branch history memory section is in an initial architecting state,
    wherein said branch direction predictor does not perform prediction of said branch direction based on said branch history when said branch history architecting state determining section determines that said branch history is in an initial architecting state.

6. A replacing method for an information processing apparatus which includes a branch history register holding, in order to predict a branch destination of a branch instruction, a correspondence table providing the correspondence between an address of said branch instruction and an address of the predicted branch destination of said branch instruction, a past branch history memory section holding past branch directions of said branch instruction as a branch history, a branch direction predictor for predicting a branch direction of said branch instruction on the basis of said branch history held by said past branch history memory section, and a branch history register updating section for updating said correspondence table held by said branch history register on the basis of the branch direction predicted by said branch direction predictor, said replacing method, used for entries of said past branch history memory section in case that all of said entries are in use when a branch history about a new branch instruction is registered into said past branch history memory section, said replacing method comprising:
    selecting one entry from all entries of said past branch history memory section if a plurality of the branch histories use all entries of said past branch history memory section when said branch history about said new branch instruction is being registered into said past branch history memory section; and replacing the branch history registered in said selected one entry with said new branch history about said new branch instruction, said selecting comprising selecting as said one entry, if past branch directions exist in the past branch history memory section, an entry in which said branch history held by said past branch history memory section includes only branches taken and in which the number of branches taken included in said branch history held by said past branch history memory section is equal to or more than a predetermined number.

7. The replacing method according to claim 6, wherein said selecting further selects, as said one entry, an entry registered earliest of all entries of said past branch history memory section, and the entry selected on the basis of said branch history held by said past branch history memory section is employed on a higher priority basis than an entry registered earliest of all entries of said past branch history memory section.

8. The replacing method according to claim 6, wherein said selecting further selects, as said one entry, an entry used earliest for prediction by said branch direction predictor of all entries of said past branch history memory section, and the entry selected on the basis of said branch history held by said past branch history memory section is employed on a higher priority basis than an entry used earliest for prediction by said branch direction predictor of all entries of said past branch history memory section.

9. A computer-readable recording medium storing a program for an information processing apparatus comprising a branch history register holding, in order to predict a branch destination of a branch instruction, a correspondence table providing the correspondence between an address of said branch instruction and an address of the predicted branch destination of said branch instruction; a past branch history memory section holding past branch directions of said branch instruction as a branch history; a branch direction predictor predicting a branch direction of said branch instruction on the basis of said branch history held by said past branch history memory section; and a branch history register updating section updating said correspondence table held by said branch history register on the basis of the branch direction predicted by said branch direction predictor, the replacing program allowing a computer to realize a replacing function used for entries of said past branch history memory section in case that all of said entries are in use when a branch history about a new branch instruction is registered into said past branch history memory section, and allowing said computer to:

function as a selector for selecting one entry from all entries of said past branch history memory section if a plurality of the branch histories use all entries of said past branch history memory section when the branch history about the new branch instruction is being registered into said past branch history memory section, and as a replacing section replacing the branch history registered in said one selected entry with the branch history about said new branch instruction; and function such that said selector selects, as said one entry, if past branch directions exist in the past branch history memory section, an entry in which said branch history held by said past branch history memory section includes only branches taken and in which the number of branches taken included in said branch history held by said past branch history memory section is equal to or more than a predetermined number.

10. The computer-readable recording medium on which a replacing program is recorded, according to claim 9, wherein said replacing program allows said computer to function such that:

said selector has a second selecting function of selecting, as said one entry, an entry registered earliest of all entries of said past branch history memory section; and said selector employs an entry selected with said first selecting function on a higher priority basis than an entry selected with said second selecting function.

11. The computer-readable recording medium on which a replacing program is recorded, according to claim 9, wherein said replacing program allows said computer to function such that:

said selector has a second selecting function of selecting, as said one entry, an entry used earliest for prediction by said branch direction predictor of all entries of said past branch history memory section; and said selector employs an entry selected with said first selecting function on a higher priority basis than an entry selected with said second selecting function.

* * * * *

UNITED STATES PATENT AND TRADEMARK OFFICE
CERTIFICATE OF CORRECTION

| | | |
|---|---|---|
| PATENT NO. | : 7,613,910 B2 | Page 1 of 1 |
| APPLICATION NO. | : 11/062472 | |
| DATED | : November 3, 2009 | |
| INVENTOR(S) | : Megumi Yokoi | |

It is certified that error appears in the above-identified patent and that said Letters Patent is hereby corrected as shown below:

Column 19, Line 41, change "register for" to --register--.

Column 19, Line 46, change "section for" to --section--.

Column 19, Line 49, change "predictor for" to --predictor--.

Column 19, Line 56, change "selector for" to --selector--.

Column 19, Line 62, change "section for" to --section--.

Column 19, Line 65, change "function of" to --function--.

Column 20, Line 13, change "An" to --The--.

Column 20, Line 21, change "An" to --The--.

Column 20, Line 53, change "predictor for" to --predictor--.

Column 20, Line 56, change "section for" to --section--.

Column 21, Line 21, change "an" to --the--.

Column 21, Line 29, change "an" to --the--.

Signed and Sealed this

Sixteenth Day of February, 2010

David J. Kappos
*Director of the United States Patent and Trademark Office*